(12) United States Patent
Choe et al.

(10) Patent No.: US 10,606,433 B2
(45) Date of Patent: Mar. 31, 2020

(54) AUTOMATIC EVENT DETECTION, TEXT GENERATION, AND USE THEREOF

(71) Applicant: AVIGILON FORTRESS CORPORATION, Vancouver (CA)

(72) Inventors: Tae Eun Choe, Reston, VA (US); Mun Wai Lee, Ashburn, VA (US); Kiran Gunda, Vienna, VA (US); Niels Haering, Reston, VA (US)

(73) Assignee: AVIGILON FORTRESS CORPORATION, Vancouver, British Columbia (CA)

( * ) Notice: Subject to any disclaimer, the term of this patent is extended or adjusted under 35 U.S.C. 154(b) by 0 days.

(21) Appl. No.: 15/440,945

(22) Filed: Feb. 23, 2017

(65) Prior Publication Data

US 2017/0300150 A1 Oct. 19, 2017

Related U.S. Application Data

(63) Continuation of application No. 13/685,025, filed on Nov. 26, 2012, now Pat. No. 8,605,084.

(Continued)

(51) Int. Cl.
| | |
|---|---|
| *G06T 15/00* | (2011.01) |
| *G06F 3/048* | (2013.01) |
| *H04N 5/262* | (2006.01) |
| *G06F 16/78* | (2019.01) |
| *G06F 16/738* | (2019.01) |
| *G06F 16/783* | (2019.01) |
| *A63F 13/352* | (2014.01) |
| *A63F 13/48* | (2014.01) |
| *A63F 13/60* | (2014.01) |

(Continued)

(52) U.S. Cl.
CPC ............ *G06F 3/048* (2013.01); *A63F 13/352* (2014.09); *A63F 13/48* (2014.09); *A63F 13/60* (2014.09); *A63F 13/795* (2014.09); *G06F 3/04815* (2013.01); *G06F 16/738* (2019.01); *G06F 16/78* (2019.01); *G06F 16/784* (2019.01); *G06F 16/7837* (2019.01); *H04N 5/2621* (2013.01); *G08B 13/19665* (2013.01)

(58) Field of Classification Search
CPC ...... G06F 3/04815; G06F 3/048; A63F 13/60; A63F 13/795; A63F 13/48; A63F 13/352
USPC .......................................................... 345/419
See application file for complete search history.

(56) References Cited

U.S. PATENT DOCUMENTS 5,835,667 A 11/1998 Wactlar et al.
7,844,587 B2 * 11/2010 Blakeley ........... G06F 17/30864
                                                    707/705

(Continued)

OTHER PUBLICATIONS

Karpathy, Andrej, and Li Fei-Fei. "Deep Visual-Semantic Alignments for Generating Image Descriptions." arXiv preprint arXiv:1412.2306 (2014).*

(Continued)

*Primary Examiner* — Phu K Nguyen
(74) *Attorney, Agent, or Firm* — Muir Patent Law, PLLC

(57) ABSTRACT

A system and method for video surveillance and searching are disclosed. Video is analyzed and events are automatically detected. Based on the automatically detected events, textual descriptions are generated. The textual descriptions may be used to supplement video viewing and event viewing, and to provide for textual searching for events.

31 Claims, 19 Drawing Sheets

Related U.S. Application Data

(60) Provisional application No. 61/563,511, filed on Nov. 23, 2011, provisional application No. 61/614,618, filed on Mar. 23, 2012.

(51) Int. Cl.
*A63F 13/795* (2014.01)
*G06F 3/0481* (2013.01)
*G08B 13/196* (2006.01)

(56) References Cited

U.S. PATENT DOCUMENTS

| | | | |
|---|---|---|---|
| 8,768,313 B2* | 7/2014 | Rodriguez | G06K 9/00986 382/118 |
| 8,792,676 B1 | 7/2014 | Jing et al. | |
| 9,129,158 B1* | 9/2015 | Medasani | G06K 9/00335 |
| 9,183,466 B2* | 11/2015 | Siskind | G06F 17/3079 |
| 9,509,968 B2* | 11/2016 | Zimmermann | G06F 17/30817 |
| 9,552,471 B1* | 1/2017 | McFarland | G06K 9/00221 |
| 9,602,738 B2* | 3/2017 | Choe | H04N 5/2621 |
| 9,721,186 B2* | 8/2017 | Song | G16H 10/60 |
| 9,747,429 B2* | 8/2017 | McFarland | G06K 9/00221 |
| 9,916,538 B2* | 3/2018 | Zadeh | G06K 9/627 |
| 2006/0112028 A1* | 5/2006 | Xiao | G06N 3/08 706/15 |
| 2006/0182310 A1 | 8/2006 | Neuhaus | |
| 2012/0249787 A1 | 10/2012 | Allegra et al. | |
| 2014/0375827 A1 | 12/2014 | Golan et al. | |

OTHER PUBLICATIONS

Farhadi, Ali, Mohsen Hejrati, Mohammad Amin Sadeghi, Peter Young, Cyrus Rashtchian, Julia Hockenmaier, and David Forsyth. "Every picture tells a story: Generating sentences from images." In European conference on computer vision, pp. 15-29. Springer, Berlin, Heidelberg, 2010.*

Ballan L, Bertini M, Del Bimbo A, Seidenari L, Serra G. Event detection and recognition for semantic annotation of video. Multimedia Tools and Applications. Jan. 1, 2011;51(1):279-302.*

Tian T, Geller J, Chun SA. Improving web search results for homonyms by suggesting completions from an ontology. InInternational Conference on Web Engineering Jul. 5, 2010 (pp. 175-186). Springer, Berlin, Heidelberg.*

Mun Wai Lee, Asaad Hakeem, Niels Haering, and Song-Chun Zhu, "SAVE: A Framework for Semantic Annotation of Visual Events," Proc. 1st Int'l Workshop on Internet Vision, Anchorage, Alaska, Jun. 2008.

Hakeem, M. Lee, O. Javed, N. Haering, "Semantic Video Search using Natural Language Queries," ACM Multimedia, 2009.

Benjamin Yao, Xiong Yang, Liang Lin, Mun Wai Lee, and Song-Chun Zhu, "I2T: Image Parsing to Text Description," Proceedings of IEEE, vol. 98, No. 8,, pp. 1485-1508, Aug. 2010.

R. Nevatia, J. Hobbs, B. Bolles, "An Ontology for Video Event Representation," IEEE Workshop on Event Detection and Recognition, Jun. 2004.

Zeeshan Rasheed, Geoff Taylor, Li Yu, Mun Wai Lee, Tae Eun Choe, Feng Guo, Asaad Hakeem, Krishnan Ramnath, Martin Smith, Atul Kanaujia, Dana Eubanks, Niels Haering, "Rapidly Deployable Video Analysis Sensor Units for Wide Area Surveillance," First IEEE Workshop on Camera Networks (WCN2010), held in conjunction with CVPR 2010, Jun. 14, 2010.

Tom Simonite, "Surveillance Software Knows What a Camera Sees," Technology Review, MIT, Jun. 1, 2010.

C. Pollard, I.A. Sag, "Head-Driven Phase Structure Grammar." University of Chicago Press, Chicago, IL, 1994.

S.C. Zhu, D.B. Mumford, "A stochastic grammar of images." Foundations and Trends of Computer Graphics and Vision, 2006.

Tae Run Chose, Mun Was Lee, Niels Haering, "Traffic Analysis with Low Frame Rate Camera Network." First IEEE Workshop on Camera Networks (WCN 2010), held in conjunction with CVPR 2010, Jun. 14, 2010.

* cited by examiner

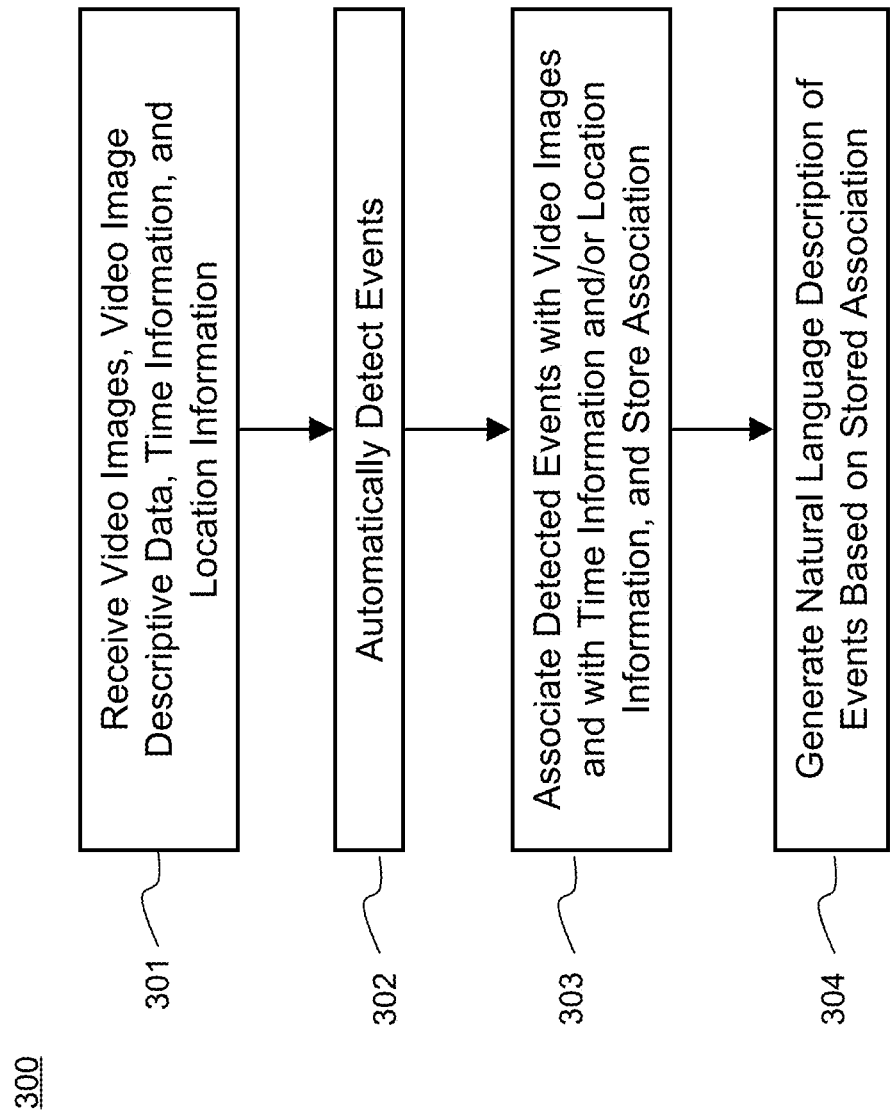

FIG. 4A

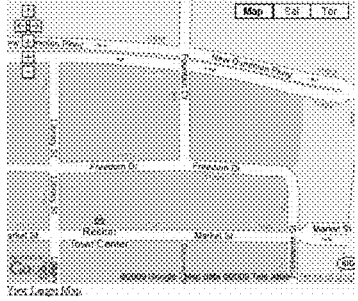

Scene Understanding
Report generated on Tue May 26 13:46:00 2009

Source Information

The source is a video. The image width is 360 and the height is 240. The duration is 59:00 and the frame-rate is 15 fps. The source location is "E:\SceneUnderstanding\Data\video_for_scene_element\TownCenter1.avs".

Scene Context

This is an urban scene. There are some road regions at the and of the image. There are some land regions and vegetation regions in the image.

There are 4 roads. Freedom Dr runs from top-right to top-left. Fountain Dr runs from top-left to bottom-right. Freedom Dr runs from top-left to top-right. Fountain Dr runs from bottom-right to top-left.

There are 2 streets. Street_0 is a two-way street with Freedom Dr and road_2. Street_1 is a two-way street with road_1 and road_3.

There is 1 intersection. Intersection_0 is a road junction.

There are 5 zones. Zone_0 is a road junction. Zone_1 is an approach of Freedom Dr to intersection_0. Zone_2 is an approach of Freedom Dr to intersection_0. Zone_3 is an approach of Fountain Dr to intersection_0. Zone_4 is an approach of Fountain Dr to intersection_0.

Object Summary

There are 412 targets. These are 308 land_vehicles and 104 humans.

Notable junction-related events

There is a possible failure to yield violation between 00:42 to 00:51. Land_vehicle_10 approach intersection_0 along Fountain Dr at 00:42. Land_vehicle_9 approach intersection_0 along Freedom Dr at 00:44. Land_vehicle_9 enter intersection_0 at 00:46. Land_vehicle_9 leave intersection_0 at 00:48. Land_vehicle_10 enter intersection_0 at 00:48. Land_vehicle_10 leave intersection_0 at 00:51.

There is a possible failure to yield violation between 04:09 to 04:18. Land_vehicle_38 approach intersection_0 along Fountain Dr at 04:09. Land_vehicle_39 approach intersection_0 along Freedom Dr at 04:12. Land_vehicle_39 enter intersection_0 at 04:13. Land_vehicle_39 leave intersection_0 at 04:15. Land_vehicle_38 enter intersection_0 at 04:17. Land_vehicle_38 leave intersection_0 at 04:18.

....

Notable speed-related events

Land_vehicle_39 move at an above-than-normal minimum speed of 19.8 mph in zone_0 (road junction) between 04:14 to 04:14.

Land_vehicle_75 move at an above-than-normal average speed of 23.1 mph in zone_0 (road junction) between 09:12 to 09:12.

....

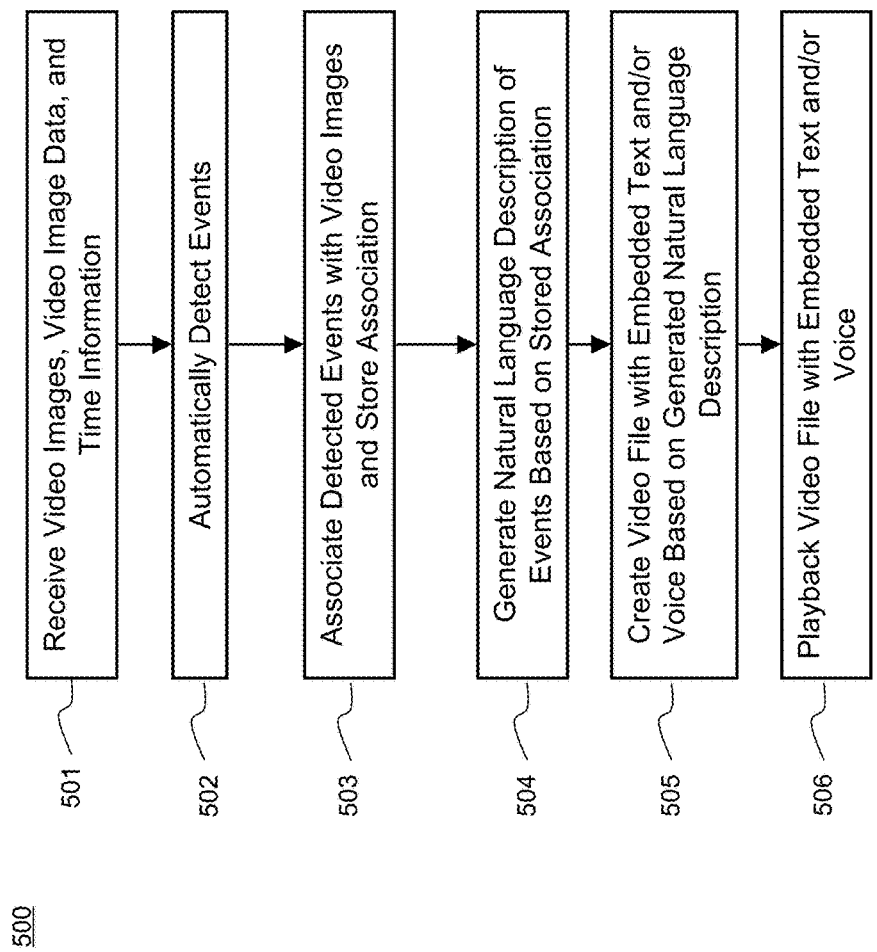

FIG. 12
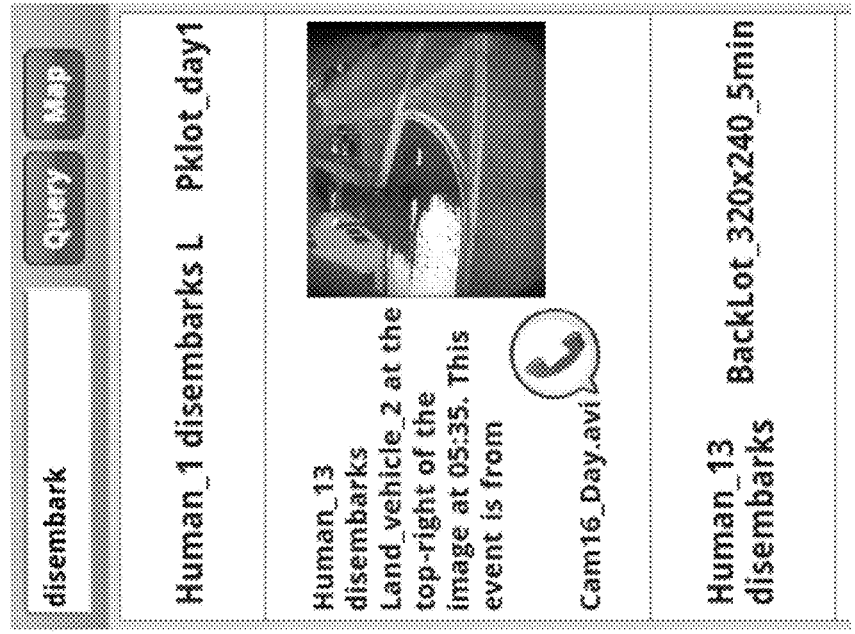
(B)
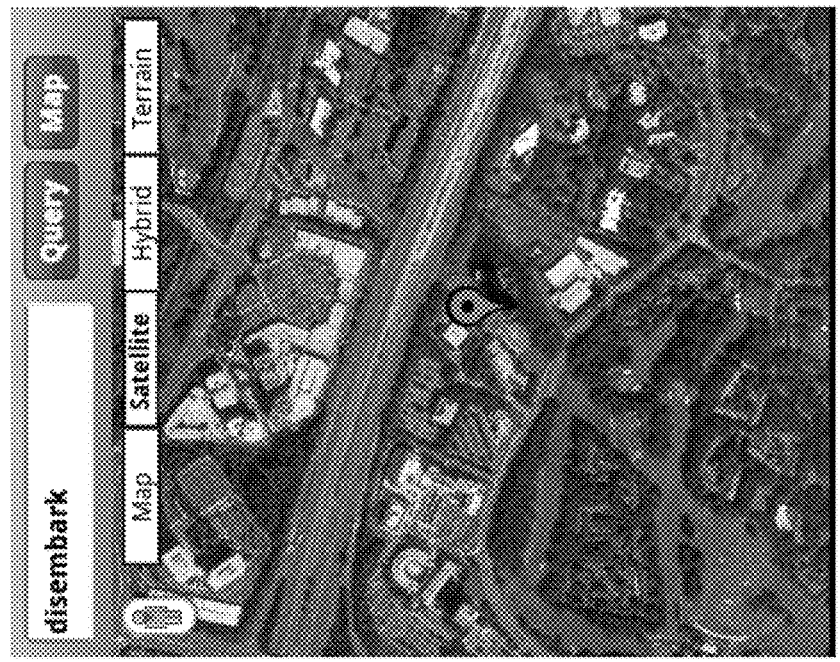
(A)

AUTOMATIC EVENT DETECTION, TEXT GENERATION, AND USE THEREOF

CROSS-REFERENCE TO RELATED APPLICATIONS

This application is a continuation application of U.S. patent application Ser. No. 13/684,025, filed Nov. 21, 2012, which is incorporated in its entirety herein by reference, and which claims priority under 35 U.S.C. 119(e) to U.S. Provisional Application Nos. 61/563,511 and 61/614,618, both of which are incorporated in their entirety herein by reference.

This invention was made with government support under Contract No. N00014-11-C-0308 awarded by the Office of Naval Research/Office of Secretary of Defense. The government has certain rights in the invention.

BACKGROUND

Automatic event detection and scene understanding is an important enabling technology for video surveillance, security, and forensic analysis applications. The task involves identifying objects in the scene, describing their inter-relations, and detecting events of interest. In recent years, there has been a proliferation of digital cameras and networked video storage systems, generating enormous amounts of video data, necessitating efficient video processing. Video analysis is used in many areas including surveillance and security, forensics analysis, and intelligence gathering applications. Currently, much of the video is monitored by human operators, but while people are good at understanding video data, they are not effective in reviewing large amounts of video due to short attention spans, vulnerability to interruptions or distractions, and difficulty in processing multiple video streams.

Recent advances in computer vision technology and computing power have produced specific capabilities such as object detection and tracking, and even textual annotation of video and searchability. A number of publications, listed below and incorporated by reference herein in their entirety, explain various aspects of these capabilities:

C. Pollard, I. A. Sag, "Head-Driven Phrase Structure Grammar," University of Chicago Press, Chicago, Ill., 1994.

R. Nevatia, J. Hobbs, B. Bolles, "An Ontology for Video Event Representation," IEEE Workshop on Event Detection and Recognition, June 2004.

S. C. Zhu, D. B. Mumford, "Quest for a stochastic grammar of images," Foundations and Trends of Computer Graphics and Vision, 2006.

Mun Wai Lee, Asaad Hakeem, Niels Haering, and Song-Chun Zhu, "SAVE: A Framework for Semantic Annotation of Visual Events," Proc. 1st Int'l Workshop on Internet Vision, Anchorage, Ak., June, 2008.

Hakeem, M. Lee, O. Javed, N. Haering, "Semantic Video Search using Natural Language Queries," ACM Multimedia, 2009.

Benjamin Yao, Xiong Yang, Liang Lin, Mun Wai Lee, and Song-Chun Zhu, "I2T: Image Parsing to Text Description," Proceedings of IEEE, Vol 98, no. 8, pp 1485-1508, August, 2010.

Tom Simonite, "Surveillance Software Knows What a Camera Sees," Technology Review, MIT, Jun. 1, 2010.

Zeeshan Rasheed, Geoff Taylor, Li Yu, Mun Wai Lee, Tae Eun Choe, Feng Guo, Asaad Hakeem, Krishnan Ramnath, Martin Smith, Atul Kanaujia, Dana Eubanks, Niels Haering, "Rapidly Deployable Video Analysis Sensor Units for Wide Area Surveillance," First IEEE Workshop on Camera Networks (WCN2010), held in conjunction with CVPR 2010, 14 Jun., 2010.

Tae Eun Choe, Mun Wai Lee, Niels Haering, "Traffic Analysis with Low Frame Rate Camera Network", First IEEE Workshop on Camera Networks (WCN2010), held in conjunction with CVPR 2010, 14 Jun., 2010.

However, scene understanding and searchability can benefit from a more thorough understanding of objects, scene elements and their inter-relations, and more comprehensive and seamless textual annotation.

SUMMARY

Exemplary embodiments disclosed herein describe an image understanding technology for video. In these embodiments, attribute image grammar may be used to extract semantic and contextual content from video sequences. In this framework, a visual vocabulary is defined from pixels, primitives, parts, objects and scenes. The grammar provides a principled mechanism to list visual elements and objects present in the scene and describe how they are related. The relations can be spatial, temporal, ontological, or causal. In certain embodiments, guided by bottom-up object and target detection, a top-down strategy is used for inference to provide a description of the scene and its constituent elements. The visual content output may be in a semantic representation format. A text generation system then converts the semantic information to text for automatic video annotation, as text reports, or as annotation overlaid or displayed beside temporal and geographical information. The annotations and reports may be provided in a natural language, sentence structure that can be displayed and read by human analysts or other users. The text and annotations may be queried using natural language terms.

The disclosed embodiments may be used in various settings, including video surveillance. In certain embodiments, a plurality of cameras are used to obtain video sequences that may be analyzed including one or more computers. The cameras may be located at any geographical location or venues. For example, the disclosed system may be used for traffic monitoring, airport security, port security, intelligence gathering, and potential threat detection. In addition, the technology can potentially be used in military applications where content extraction and text report generation can enhance situation awareness for troops operating in complex and demanding urban and maritime environments.

In certain embodiments, event detection, text generation, and placement of the text within a video, image, or browser can each occur automatically, without the need for user involvement. In addition, users can perform semantic searches and can search for video based on geographical location and/or universal time. This speeds up search time and retrieval, and improves accuracy for targeted searches.

BRIEF DESCRIPTION OF THE DRAWINGS

These and/or other aspects, features, and advantages will become apparent and more readily appreciated from the following description of exemplary embodiments, taken in conjunction with the accompanying drawings of which:

FIG. 3 is a flow chart showing an exemplary method of generating descriptions of video, in accordance with certain exemplary embodiments;

FIGS. 4A and 4B are exemplary reports generated based on video, in accordance with certain exemplary embodiments;

FIG. 5 is a flow chart showing an exemplary method of embedding text and/or voice in video, in accordance with certain exemplary embodiments;

FIG. 12 is a depiction of an exemplary interface for search and retrieval of video information that can be used on a portable device, in accordance with certain disclosed embodiments.

DETAILED DESCRIPTION

Figure 1:
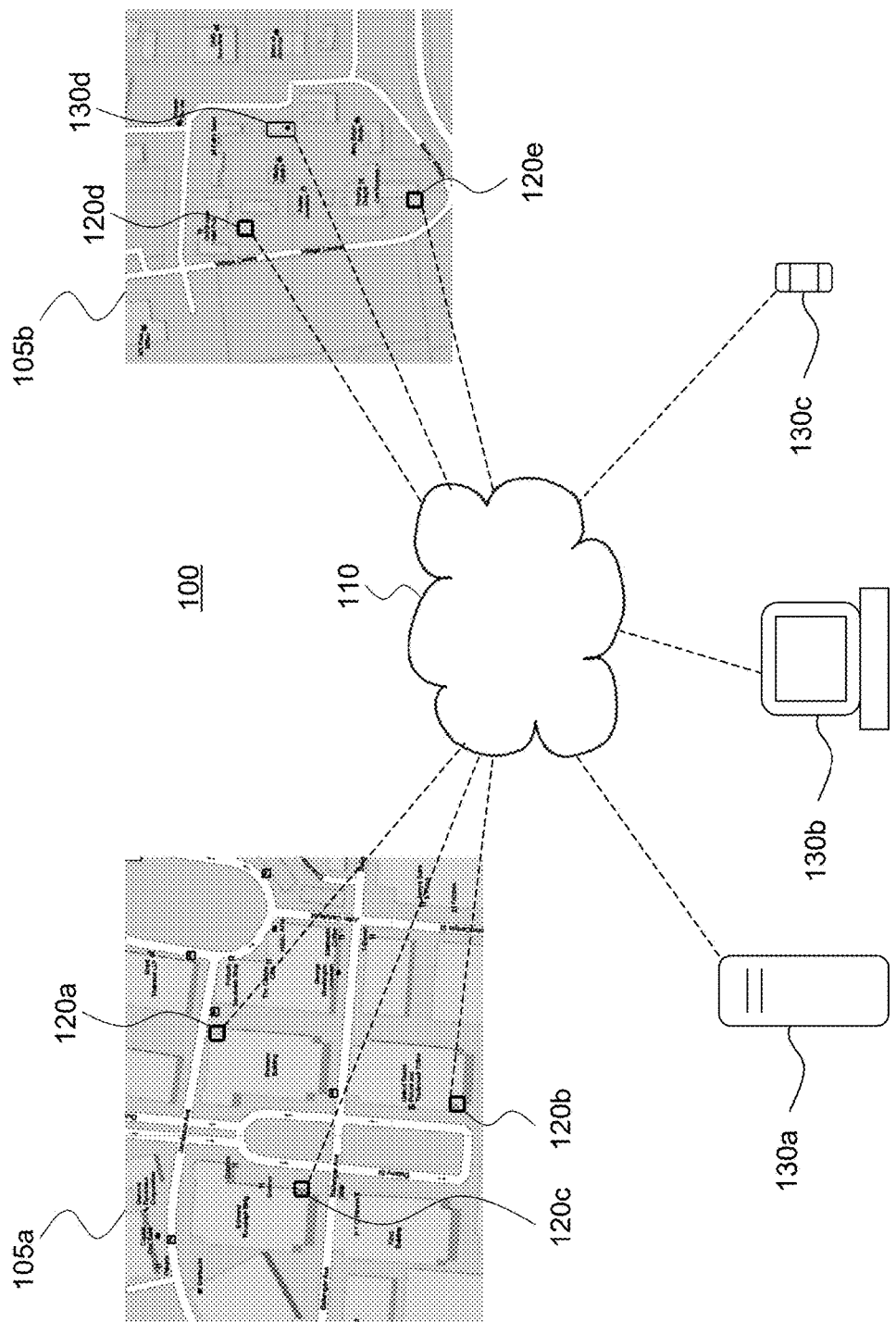
FIG. 1 is a diagram depicting an exemplary video surveillance system, in accordance with certain exemplary embodiments.

The present disclosure now will be described more fully hereinafter with reference to the accompanying drawings, in which various embodiments are shown. The invention may, however, be embodied in many different forms and should not be construed as limited to the embodiments set forth herein. Like numbers refer to like elements throughout.

It will be understood that when an element is referred to as being "connected" or "coupled" to or "in communication with" another element, it can be directly connected or coupled to or in communication with the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another. For example, a first event could be termed a second event, and, similarly, a second event could be termed a first event without departing from the teachings of the disclosure.

The terminology used herein is for the purpose of describing particular embodiments only and is not intended to be limiting of the invention. As such, the examples described here are just that—examples. Not all examples within the scope of the general concepts of the invention are discussed herein, and the omission of particular examples does not mean that such examples are excluded as being within the scope of the invention.

As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Method steps described herein, although shown in a particular sequence, do not necessarily follow that order. As such, method steps described in this disclosure before or after other method steps, may be in that order, or may occur in other orders if the specification and its context do not indicate otherwise.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 depicts an exemplary video surveillance system 100, in accordance with certain exemplary embodiments. Video surveillance system 100 includes one or more geographical areas 105a and 105b, network 110, one or more video cameras 120a-120e, and one or more computing devices 130a-130d.

Each geographical area 105a or 105b may be an area monitored by one or more video cameras. For example, as shown in FIG. 1, geographical area 105a includes video cameras 120a, 120b, and 120c, and geographical area 105b includes video cameras 120d and 120e. Each geographical area 105a, 105b may include a plurality of geographical locations. For example, geographical areas 105a and 105b may include geographical locations defined according to latitude and longitude coordinates derived from, for example, Global Positioning System (GPS) data. Geographical areas 105a and 105b may also include geographical locations defined according to map and/or image data of the geographical area, for example based on Geographical Information System (GIS) data. Examples of geographic locations include, for example, a latitude and longitude coordinate pair, an intersection of streets, a street address, a particular block, etc. As described further below, certain video cameras and computing devices located within geographical areas 105a and 105b may be associated with geographical locations at which they are located or from which they obtain video images.

Examples of geographical areas where a surveillance system may be set up include city streets, ports, airports, or other such areas. Although geographical areas are primarily discussed here, certain aspects of the disclosure can be implemented in areas where geographical information is not known or needed, such as within airport terminals, subway terminals, or other facilities that can be mapped according to their internal structure.

Network 110 may be, for example, a computer network such as a wide area network (WAN), local area network (LAN), or other network. For example, in one embodiment, network 110 may be implemented on the Internet or a private, secure WAN. Network 110 may include any combination of known wireless, wired, optical, or other communication media and devices.

Network 110 may physically span geographical areas 105a and 105b, as well as areas where computer devices 130a, 130b, and 130c are located. However, in certain embodiments, the entire video surveillance system 100 may be physically contained within a particular geographical area (e.g., area 105a only). For example, if closed circuit television systems are used, then all of the video cameras and optionally all of the computer devices used for monitoring the geographical area may be physically located in that area.

The video cameras 120a-120e can be, for example, digital or analog cameras including image capturing hardware, such as lenses, image sensors such as CMOS sensors, microprocessors, memory chips, other circuitry, and image processing software. The video cameras may include other known components as well. In one embodiment, the video cameras include hardware and software for performing analysis on collected data, such as video content analysis (VCA). As one example, a video camera may include a video sensor, which may be optionally connected to a video recorder, such as a digital video recorder (DVR) or a network video recorder (NVR). The video recorder may be programmed to perform certain analysis. As such, the video cameras and/or video recorder may serve as a video source for providing video images and video image descriptive data to one or more computing devices 130a-130c.

Computing devices 130a-130c may include one or more computers, such as servers, desktop computers, laptop computers, tablets, smart phones, or other such devices. In certain embodiments, for example, a computer device such as 130a may be a server computer that is part of a server system. The server system may include one or more server computers that may singly or collectively perform one of more of the methods disclosed herein. Computer device 130b may correspond, for example, to a desktop computer, or a laptop computer or tablet, which may be portable and wirelessly enabled. Computer device 130c may correspond, for example, to a smart phone, PDA, or other handheld device (including a tablet), and may be wirelessly enabled and portable. In addition, computer devices, such as 130b and 130c may be equipped with a geographical locating system, such as GPS, for example, that tracks the geographical location of the device. Computer devices 130a-130c may include hardware and software that enable such devices to communicate over network 110 using standard communication technologies, and that enable the computer devices to perform the methods disclosed herein. In addition, computer devices 130b-130c may include one or more applications that allow users to interact with and view video, as well as map information, on a display. For example, computer devices 130b-130c may include one or more browser applications (e.g., Google Chrome, GoogleEarth, Microsoft Internet Explorer, Safari, or similar browser systems for smart phones) and an operating system that can display the various pages, images, text, and videos discussed herein.

FIG. 2 depicts an exemplary system 200 for generating text related to video, in accordance with certain exemplary embodiments. In some embodiments, certain hardware and/or software modules are used to automatically generate textual descriptions of captured video sequences. The hardware and software modules may be included in different parts of a system, such as the video surveillance system 100 depicted in FIG. 1. Though certain examples of the location of these hardware and software modules may be described below, these are examples only, and the modules can be in various parts of the system 100 according to different system preferences. In addition, although the modules are shown as different blocks, these blocks are conceptual, and the methods and actions performed by the exemplary blocks need not be separately performed by the different modules. For example, certain of the modules may be combined as part of a single computer program such that they act together to perform certain methods.

FIG. 2 shows a input imagery block 210, an image analysis engine 220, an attribute graph grammar module 230, a content inference engine 240, a semantic inference engine 250, a text generation engine 260, and a user block 270.

Input imagery block refers to one or more devices and method for collecting images. For example, it may refer to a plurality of video sources, such as the video cameras depicted in FIG. 1, that capture video frames each including a video image. In some embodiments, the input imagery, such as a set of video images, is then processed by an image analysis engine 220. For example, the image analysis engine 220 may be hardware and software embedded in or locally attached to the video sources (e.g., in an embedded or locally attached DVR). Alternatively, the image analysis engine 220 may be remotely provided, for example, in another computer device such as one of computer devices 130 depicted in FIG. 1.

Image analysis engine 220 performs various bottom-up image analysis including, for example, edge detection, segmentation, moving blobs detection, line extraction, color detection, and appearance-based object detection. As a result, bottom-up proposals for image content are created. The results of the image analysis performed by image analysis engine 220, including the bottom-up proposals and/or analysis data, are sent to content inference engine 240, which will be described further below.

Attribute graph grammar module 230 models the content of video images in terms of objects in a scene, scene elements, and their relations. The model defines the visual vocabulary, attributes of scene elements, and their production rules. For example, in one embodiment, a stochastic attribute image grammar serves as a unified framework for analysis, extraction, and representation of the visual elements and structure of a scene, such as the ground plane, sky, buildings, vehicles, and humans. These images elements form the basis of a visual vocabulary of scenes. At the lowest level of the grammar graph are the basic image elements (also described as "primitives") such as image patches, lines or color blobs. Serving as basic cues for understanding image content, these primitives can be combined to form larger objects and scene structure. The production rules realize composition of the image elements with attributes. As further illustrated in FIG. 2B, graphs are used to represent the grammars where the nodes represent the visual elements and the edges show the rules defining the relations between the elements.

An exemplary attribute graph grammar consists of four components: (1) A set of terminal nodes that represent basic image elements; (2) a set of non-terminal nodes that represent composite image elements; (3) a set of production rules that describe how non-terminal nodes can be expanded; and (4) a set of configurations (or instances) that can be generated by the production rules starting from a root node.

In one embodiment, a terminal node represents a single image entity. It can be, for example, a scene region (e.g., water body), object (car, boat, etc.), or image primitives (blob, rectangle, edge, etc.). Each production rule specifies how a non-terminal node can be expanded into two or more nodes (terminal or non-terminal). For example, a node representing an urban scene can be expanded into nodes representing the sky, human-made structures, and roads. The production rule also describes the constraints relevant to these visual elements, such as their spatial relations and shared attributes.

The attribute graph grammar module 230 may be used as an input, or on a lookup basis, along with the image analysis engine 220 results, to be processed by content inference engine 240. Using content inference engine 240, image content extraction may be formulated as a graph parsing process to find a specific configuration produced by the grammar that best describes the image. An inference algorithm finds the best configuration by integrating bottom-up detection and top-down hypotheses. As illustrated in FIG. 2B, using a maritime scene as an example, bottom-up detection may include classification of image patches as sky and water region, detection of moving objects, and watercraft classification, and these generate data-driven candidates for scene content. Top-down hypotheses, on the other hand, are driven by scene models and contextual relations represented by the attribute grammar, such as the port scene model and ship-wake model. The fusion of both the bottom-up and top-down approaches results in a more robust image content extraction.

The output of the content inference engine 240 module includes image and video parsing. For example, the output can include object detection, and can include time information and/or geographic information associated with the objects detected. For example, the content inference engine 240 can output data that includes objects existing in a video sequence, along with time stamps (either in universal time, or as a temporal location within a video sequence) of when the objects exist in the video sequence, and geographic information indicating, for example, a geographic location where the objects are located for each time stamp.

The output from content inference engine 240 is input to semantic inference engine 250. Semantic inference engine 250 performs analysis at a semantics level, and also performs event detection. For example, based on detected basic image elements, objects, and structures, in combination with associated time information and/or geographic information, semantic inference events that occur in a video sequence can be detected. The events can also be associated with a grammar structure that organizes the relationships between lower level events and complex events, to allow for text generation.

The output from semantic inference engine 250 is input to a text generation engine 260, which uses the semantic information as well as applied grammar rules and other information received in connection with the events to formulate textual descriptions of the events. The textual descriptions can then be sent to users 270 in the form of displayed text, for example, displayed in conjunction with a video, displayed on a map, displayed as search results, and/or displayed in other ways. Attribute grammar graph module 230, content inference engine 240, semantic inference engine 250, and text generation engine 260 can all be implemented with hardware and/or software on one or more computer devices. In one embodiment, attribute grammar graph module 230, content inference engine 240, semantic inference engine 250, and text generation engine 260 are included in a server system.

Figure 2A:
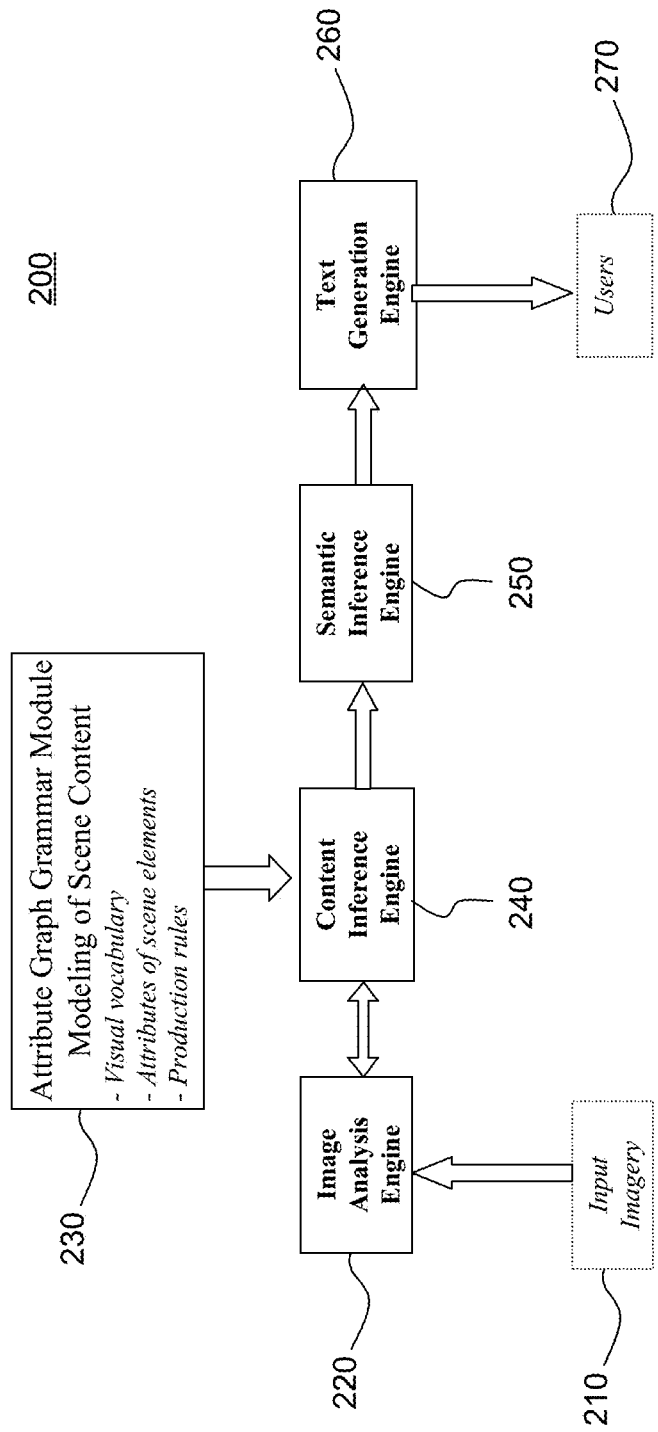
FIG. 2A is a block diagram depicting an exemplary system for generating text related to video, in accordance with certain exemplary embodiments.
Figure 2B:
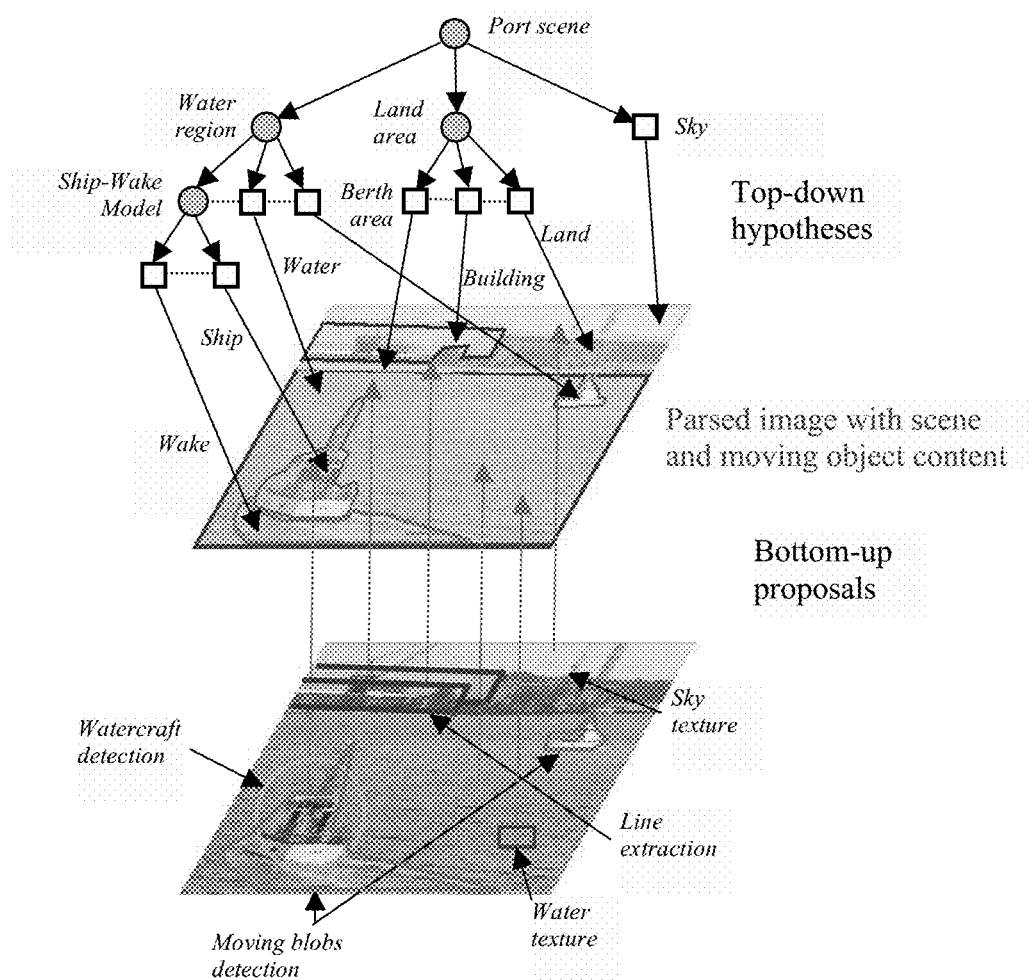
FIG. 2B is a conceptual diagram depicting an exemplary grammar structure for generating text related to video, in accordance with certain exemplary embodiments.

Additional details of the modules and flow process depicted in FIGS. 2A and 2B are described in U.S. Provisional Application Nos. 61/563,511 and 61/614,618, to which this application claims priority, and both of which are incorporated in their entirety herein by reference.

FIG. 3 shows an exemplary method 300 of generating descriptions of video, in accordance with certain exemplary embodiments. In step 301, video images are received, along with video image descriptive data, including time information and/or location information. The video images may each correspond, for example, to the visual image that appears in a video frame of a video sequence (the video sequence including a plurality of video frames). The video image descriptive data may include, for example, information about video images of the video sequence, such as objects in the video sequence, time of the video frames in the video sequence, and location of the video. The video images may be received, for example, at one or more video cameras and then at a server system. The server system may be in communication with the one or more video cameras that capture video images, and may receive the video images transmitted from the video cameras. The video image descriptive data may be generated at the server system or another system remote from the video cameras, or video image descriptive data may be generated at the video cameras if embedded processing capabilities are included in the video cameras. Additionally, or alternatively, the video image descriptive data may be generated or at local devices, such as a DVR, connected to the video cameras. As a result of the video image descriptive data being generated, objects and other attributes of video images can be detected.

The time information may include, for example, a local time (e.g., 12:00 p.m. Eastern Standard Time, 3:45 p.m. Pacific Standard Time, 1:30 Greenwich Mean Time, etc.). Time information that represents a local time, for example, a time that would appear on an analog or digital clock, is referred to herein as a universal time. The time information may additionally or alternatively include a temporal location, such as a temporal location within a video sequence (e.g., at time 54:12 of the video sequence). The time information may be received, for example, from video cameras, or other devices (e.g. GPS device) connected to the video cameras, or may be received from within a server computer or other device that receives the video images from the video cameras.

The location information may include, for example, a geographic location, such as discussed above, or another location relative to the video images in the video sequence. The location information may be determined in various ways. For example, it may be determined based on a pre-stored location of a video camera that captures the video images, based on a GPS location or GIS-determined location of the video camera, based on automatically geographically registered camera parameters, based on the scene features corresponding to GIS location, based on the processed video images, or combinations thereof.

In one embodiment, the video images, and video image descriptive data (including, for example, time information, and location information) are all received at and stored at a server system, which associates the different received information with each other as appropriate. As an example, if a first person "A" is detected at a first GPS location at time X and at a second GPS location at time Y, and again at the second GPS location at time Z, and a second person "B" is detected at the first GPS location at time Y and the second GPS location at time Z, that information can be stored in a database. Certain detected objects in a video image may be referred to herein as "agents."

Based on the information received in step 301, events are automatically detected (step 302). The events may include atomic events (e.g., events that cannot be further broken down), such as "appear," "enter a scene," "exit a scene," "move," "stationary," or "disappear." Using the example above, an atomic event can be that person A appears at first location at time X, and person A moves from first location to second location between times X and Y. The events may also include complex events, which in one embodiment are determined based on a combination of atomic events. For example, based on the examples above, a single-agent complex event may include a "stop" event, wherein person A is detected as stopping at the second GPS location at time Y. In addition, multiple-agent complex events may also be detected. For example, an event such as a catch-up event (B catches up to A at second location at time Z), or a meet event (B meets A at a second location at time Z) may be detected. More complex events can be determined based on the event grammar and based on particular rules set to detect certain types of events.

In step 303, detected events are associated with video images and time and/or location information, and the association may be stored, for example in a database. In one embodiment, the information is stored at a server system, which can be the same server system that stores the information discussed in step 301. However, the storage devices and storage locations need not be the same. As an example of stored information, again using the above scenario, a database can store a record of the "person A appears" event in association with a stored set of video images that make up the event, and in association with the first location and time X. A "person A moves" event record can be stored in association with a stored set of video images that make up the event, and in association with the first and second location and times X and Y. A record of the "person A stops" event can be stored in association with video images of the event and in association with the second location and time Y; and a record of the "B catches up to A" event can be stored in association with a set of video images that make up the event and in association with the second location and time Z, etc.

In step 304, a natural language description of the events is generated, based on a stored association. For example, based on the "appears" event, a sentence such as, "Person A appears at location 1 at time X," can be generated. Similarly, based on the "catches up" event, a sentence such as "Person B catches up to Person A at location 2 at time Z," can be generated. In certain embodiments, the steps 301-304 can be performed using the systems described above in connection with FIGS. 1 and 2. The steps may be performed, for example, based on video sequences captured from one or more cameras in communication with one or more central computers, and using one or more software programs that include various algorithms.

In one embodiment, the natural language descriptions are also stored in association with the event information, time information, and location information.

Figure 4B:
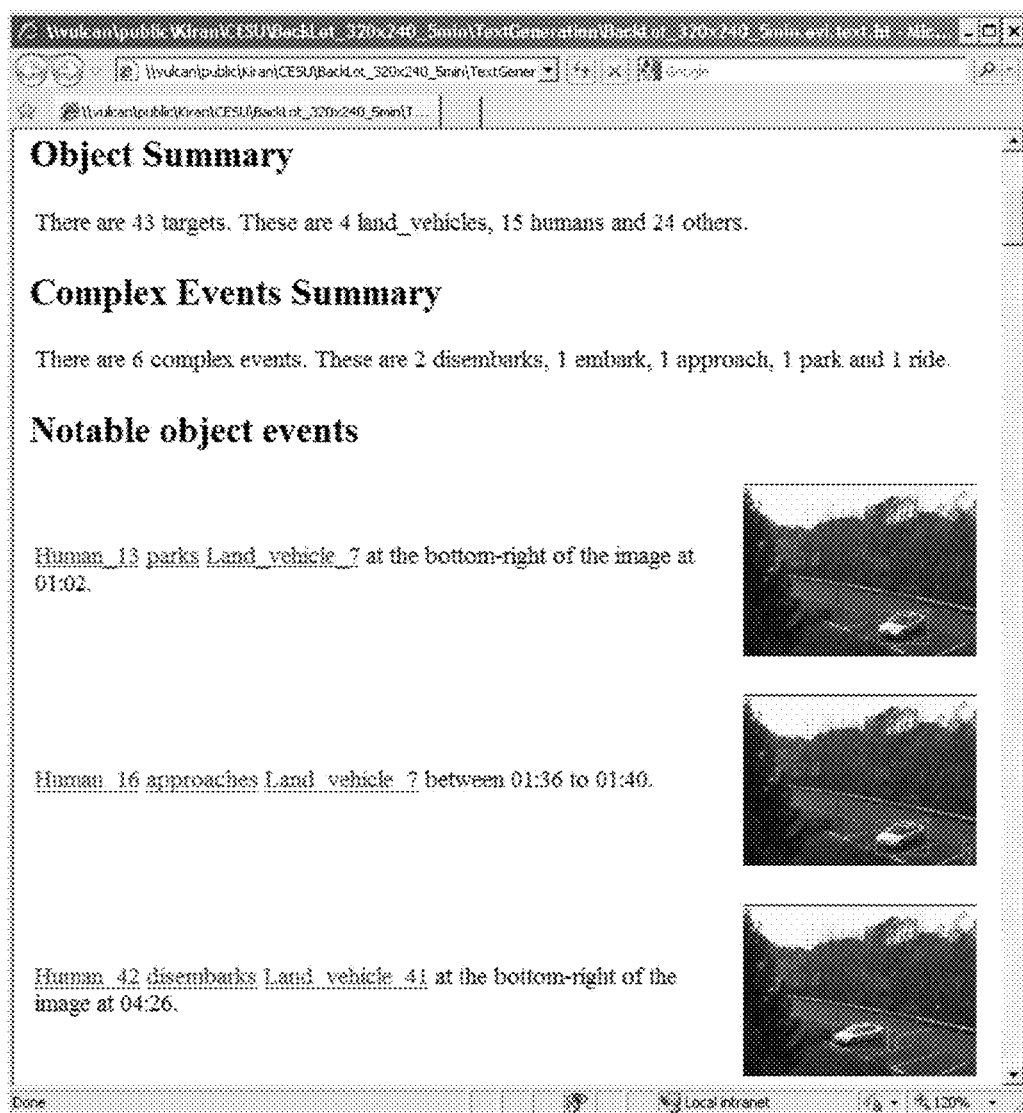

FIGS. 4A and 4B are exemplary reports generated based on video, in accordance with certain exemplary embodiments. In one embodiment, natural language descriptions generated as a result of a method such as discussed in FIG. 3 can be used to create a report describing a scene understanding. The report may include information such as source information about the time and location where the video occurred; a description of the scene context, such as the type of location, a road layout of the scene, etc.; an object summary; and notable events broken down according to event type. An example of a natural language textual description shown in FIG. 4A includes the statement, "There is a possible failure to yield violation between 00:42 to 00:51." Other statements are also shown in FIG. 4A. Certain text in the report can include clickable links to further information about the events. In addition, a report can include a geographical image, such as a map, associated with the events described in the report. Although certain examples are shown in FIG. 4A, other types of information can be included in reports generated based on textual descriptions generated by a method such as disclosed in FIG. 3.

FIG. 4B shows an exemplary report displayed in a browser. The report can include, in addition to textual descriptions such as described in FIG. 4A, clickable descriptions of events displayed in association with still images associated with the events. The report may be displayed, for example, in a Web page format. For a report such as shown in FIG. 4B, a user can easily scroll through the different events and can select one to obtain more information (e.g., an actual video clip) related to the events.

FIG. 5 shows an exemplary method of embedding text and/or voice in video, in accordance with certain exemplary embodiments. The method can be carried out by a video surveillance system, such as depicted in FIG. 1, for example. Steps 501-504 may be similar to steps 301-304 described above. For example, in step 501, video images may be received along with video image descriptive data, including at least time information. Additionally, geographical information may be received. The time information may include, for example, universal time, or a temporal location. The geographical information can include, for example, GPS, GIS, or map data. The video images may received by and from video cameras configured to capture one or more video sequences that include a plurality of video images.

In step 502, events are automatically detected. For example, both atomic events and complex events may be detected. The events may be detected, for example, by a processing system such as described above in connection with FIGS. 1, 2A, and 2B, that is configured to generate video image descriptive data and to automatically detect events that involve at least one agent in a video sequence.

In step 503, the detected events are associated with the video images that correspond to the events, and the association may be stored, for example, in a storage system. For example, the association may be stored at a server system that includes one or more databases. The relevant time may also be associated with the information stored in the database, as well as relevant location information. In step 504, a textual description of each event may be automatically generated and stored. It may be generated by, for example, one or more modules in the system such as described in FIGS. 1, 2A, and 2B, and may be stored in such systems. In one embodiment, the textual description is a natural language description, and may further be in the form of a sentence.

In one embodiment, in step 505, a video file including embedded text and/or voice is created. The file may be created by a file generator configured to generate video files along with text and/or along with additional voice. For example, one or more devices and/or modules shown in the systems depicted in FIGS. 1, 2A, and 2B may be used to generate the video files. The files may include text embedded based on the natural language description created in step 504. The files may include a first video sequence and may include, for part of all of the video sequence, embedded text that reflects the textual description of particular events, inserted in the video sequence based on the associated time. For example, the sentence, such as, "There is a possible failure to yield violation between 00:42 to 00:51," can be embedded as text and/or voice in frames that include video images that correspond to the possible failure to yield violation when it occurred. In one embodiment, the video file with embedded text and/or voice is generated automatically. An example of a type of file created in such a manner includes an AVS (AVISynth) file or video management system (VMS) file. The voice, if included, may be created using a text-to-speech system. In step 506, the video file can be played back with the embedded text and/or voice. For example, a browser or other application capable of playing back AVS files can be used for playing back the video file.

Figure 6:
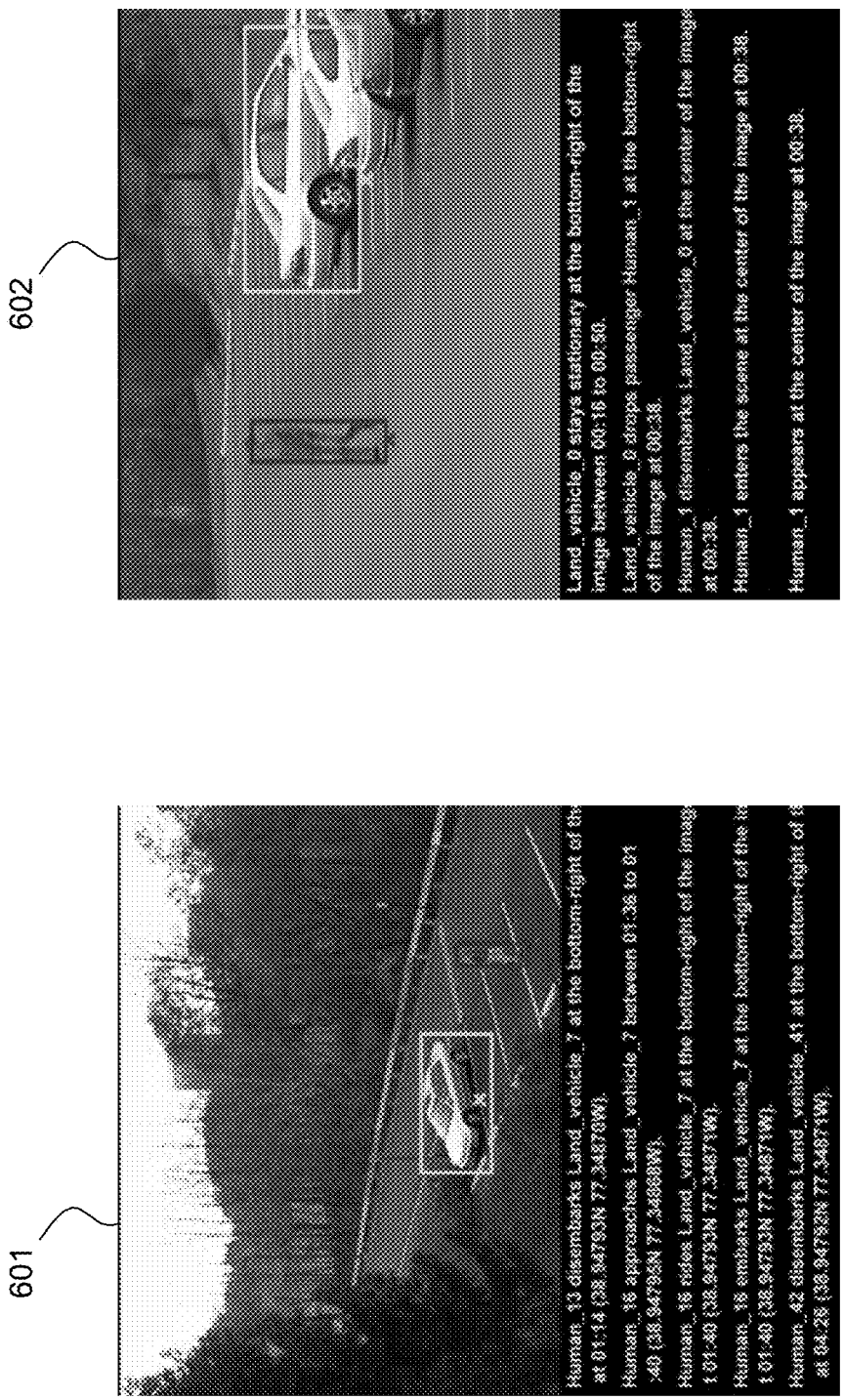
FIG. 6 depicts exemplary video frames resulting from automatic event detection, in accordance with certain exemplary embodiments.

FIG. 6 shows two examples of video files that can be played back according to the method of FIG. 5. Although each example 601 and 602 in FIG. 6 shows a still image, during an actual playback, the scene in the image portion of the frame would be a continuous video scene, and in synchronization with the scene, the list of events shown below the image portion of the frame can be displayed.

Frame 601 shows a snapshot of a video play back where only complex events are included in the text portion of the frame. Frame 602 shows a snapshot of a video play back where both complex events (e.g., land vehicle drops passenger event, and human disembarks event) and atomic events (e.g., land vehicle stays stationary, human enters the scene, and human appears events) are listed. The different types of events in scene 602 may be differentiated based on, for example, a text color or other text attribute. The exemplary video scenes 601 and 602 also show boxes around the objects (or agents) that are described in the text description. In one embodiment, based on the detected objects and their movement (or non-movement), along with text that appears simultaneously with an event occurrence, boxes or other highlighting mechanisms can follow the objects being described in the textual descriptions. This further improves the surveillance capabilities of the system. Because the object and event detection is determined automatically at the front end, integrated video frames, shown for example in FIG. 6, are seamlessly created, with little or no user interaction.

Although the text is shown appearing at the bottom of the frame in the video play back, the embedded text can appear at different locations, based on a desired layout. In addition, the time information and/or location information, although displayed for different examples in FIG. 6, can include one or more of a temporal location, a universal time, an image location (i.e., location within the video image), or a geographical location.

As a result of the method shown in FIGS. 5 and 6, video surveillance professionals can view video sequences, which in some cases may be far more complex than the scene shown in FIG. 6, with the assistance of automatic natural language descriptions of the scene, as well as highlights in the scene, that automatically depict what is occurring in the scene. This can be a particularly useful aid, for example, in an airport when a surveillance team is monitoring potential bags left unattended, or in a busy section of a city, to monitor cars that perform certain driving violations. In prior systems, in order to embed text or voice related to events in a video sequence, users would typically review the video sequence and embed text or voice manually, and the text would not necessarily be in an easily comprehensive form (i.e., complete sentence) and would not necessarily include precise or accurate time information or geographical information. Therefore, with the system described herein, more accurate and effective video surveillance can be achieved.

In certain embodiments, to even further assist surveillance professionals in identifying video that may be of interest, events and video clips of events can be searched for by using text-based searching. As a result, without the need for manual entry of events or for human review of video, video sequences received from a plurality of video cameras can be easily searched for based on their geographical information and/or universal time information by using semantic search algorithms. As an initial example (more general examples are described below), a user may wish to search for all passenger pickups by vehicles on a particular block within a given time period. To do so, the user may simply enter a search term, such as "passenger pickup" and may additionally enter a location and a time period, and the system can automatically return a list of relevant events. The list can include embedded video clips, or links to the video clips. A more general discussion of search features follows.

Figure 7:
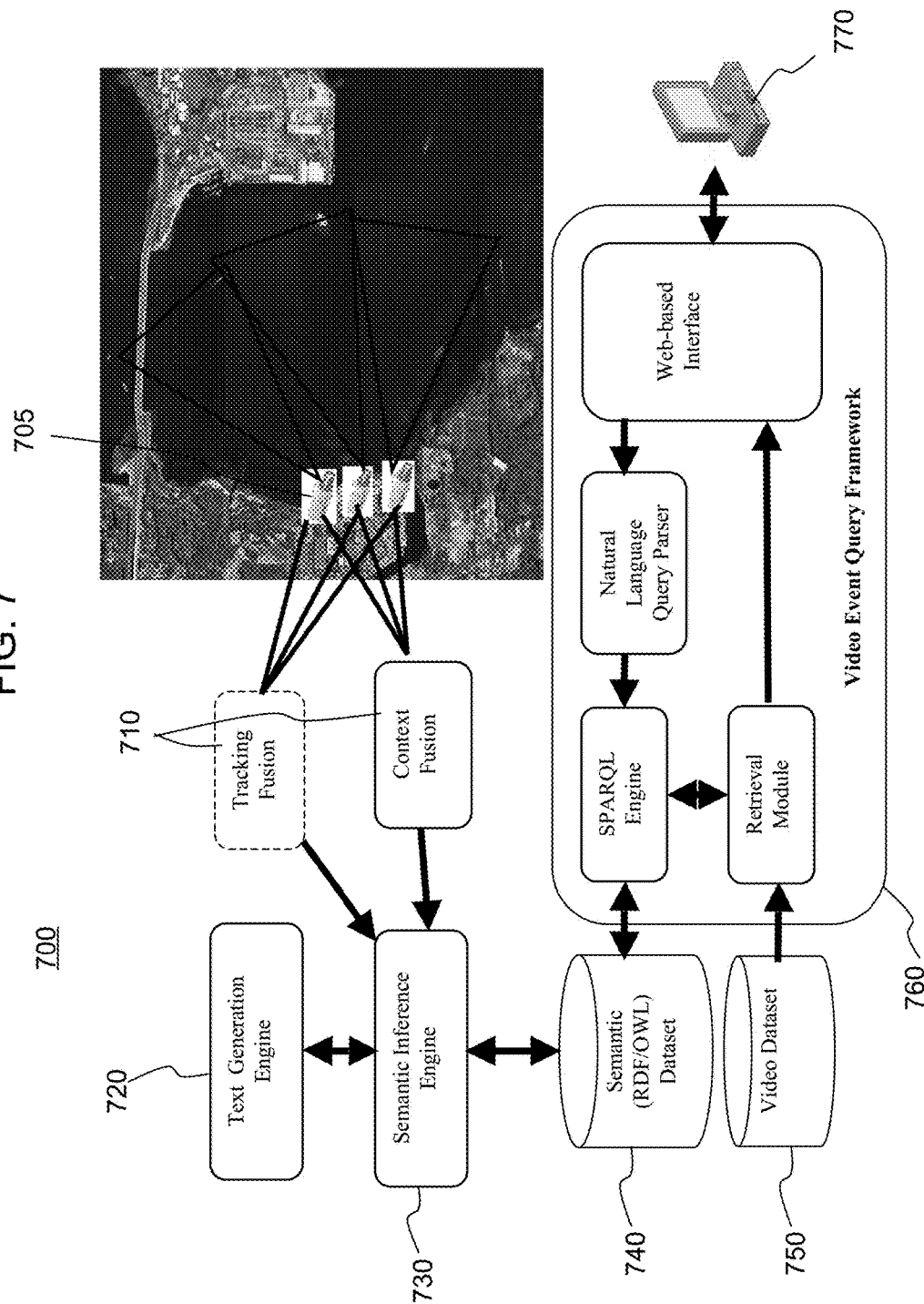
FIG. 7 is a diagram of an exemplary system for searching for and retrieving video information, in accordance with certain exemplary embodiments.

FIG. 7 is a diagram of an exemplary system 700 for searching for and retrieving video information, in accordance with certain exemplary embodiments.

As depicted in FIG. 7, a video search system 700 includes video cameras 705 on one end, a computer device 770 on the other end, and a hardware and software-based infrastructure in between that provides for searchable video sequences in the manners disclosed herein. The computer device 770 may be, for example, a desktop, laptop, or hand-held computer (e.g., smart phone, tablet computer, etc.) configured for Internet or other network access. The computer device 770 may include a search entry interface, such as a Web browser or other browser. The infrastructure may include, as shown, elements 710 for collecting and organizing tracking information and contextual information related to captured video images; a text generation engine 720; a semantic inference engine 730; a semantic dataset 740 (e.g., RDF/OWL), a video dataset 750, and a video event query framework 760, which may include, for example, a search engine (e.g., SPARQL engine), a natural language query parser, a retrieval module, and a web-based interface (e.g., ASP.NET, Java). The web-based interface allows users to perform video event searching through a Web-based portal. In one embodiment, the query engine, and retrieval module (which can include a database) are hosted on a Web server. As a result, a user can search for video events with a standard Web browser on any device with Web-browsing capabilities connected to the relevant network. Additional details about the different components of FIG. 7 are described in U.S. Provisional Application Nos. 61/563,511 and 61/614,618, to which this application claims priority, and both of which are incorporated in their entirety herein by reference.

Figure 8:
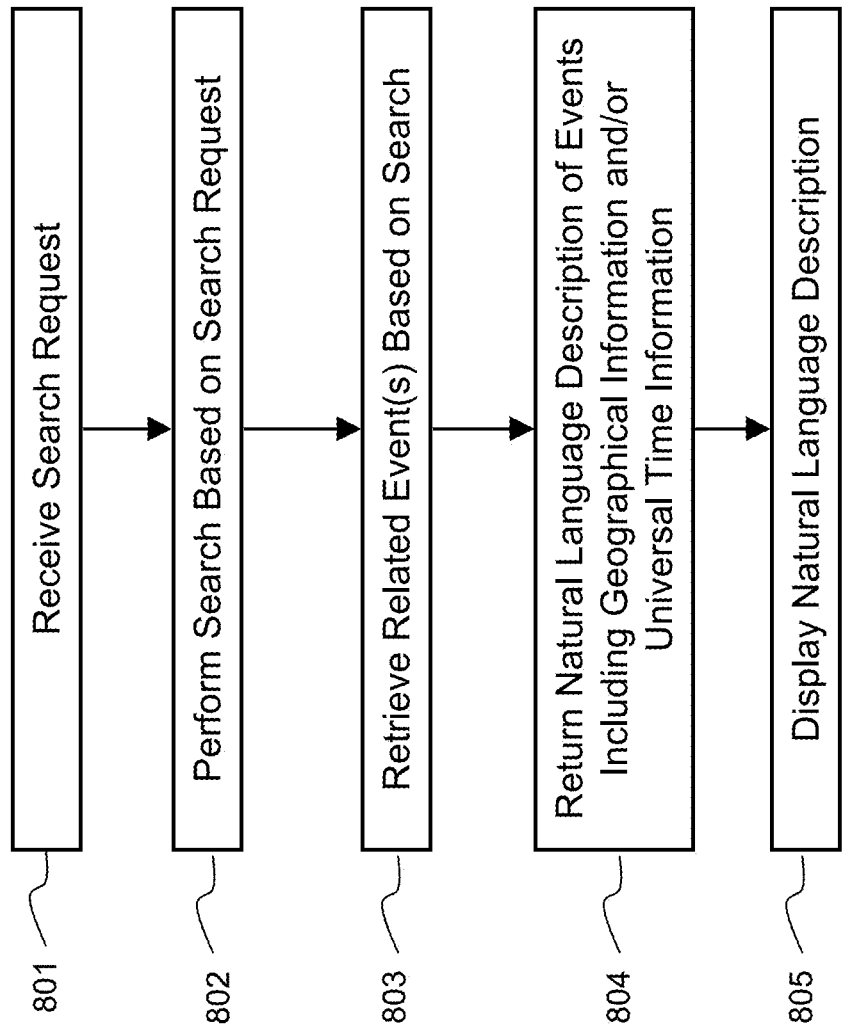
FIG. 8 is a flow chart showing an exemplary method of searching videos, in accordance with certain exemplary embodiments.

FIG. 8 shows an exemplary method 800 of searching videos, in accordance with certain exemplary embodiments. The search method 800 shown in FIG. 8 may be performed to retrieve data that was automatically generated, for example, as a result of the method discussed previously in connection with FIGS. 3 and 5. For example, the search method 800 may be used to search for video based on certain events which were automatically detected, and for which natural language textual descriptions were automatically generated. Records of the events may be stored, and may be searched for to locate and retrieve the natural language textual descriptions and/or its associated video.

In step 801, a search request is received. The request may be received from a computer, such as computer device 770. The search request may include one or more natural language terms (e.g., words that occur in spoken language and written literature), and may optionally include further details for narrowing a search, such as location and/or time information. Exemplary interfaces for inputting a search are shown in FIGS. 9, 10A, 10D, and 10E, which will be described further below. The search request may be received, for example, at a central computer system, such as a server system. The central computer system may be the same system that receives video images and automatically detects events, such as described above.

In step 802, a search is performed using the search request. For example, search algorithms that allow for semantic searching may be used to convert the entered text into query information and logic for performing a related search. In step 803, based on the search, resulting events may be retrieved. For example, natural language descriptions of the events, along with associated information, such as geographical information and time information may be retrieved. In step 804, information indicating the events and related information is returned. For example, the information may be transmitted from a server computer or other computer performing the search to the requesting computer (e.g., computer device 770). The information may be returned in different formats, as will be described below. In step 805, the returned information is displayed. For example, the returned information may include a natural language description of events that match the search query input. The results may be displayed, for example, in a browser of the requesting computer. Examples of search input and results displays and interfaces are shown in FIG. 9 and FIGS. 10A-10E.

Figure 9:
FIG. 9 is a depiction of an exemplary search entry and retrieval interface, in accordance with certain exemplary embodiments.

As shown in FIG. 9, a search entry interface according to one embodiment includes a text input box and a search button. In addition, search results can be displayed concurrently with the text input box and search button. A user can perform semantic searches by entering certain natural language terms (e.g., "find enter events" as shown in FIG. 9). Based on semantic search algorithms, the surveillance system can return results based on the semantic search. In the example shown in FIG. 9, the results include natural language descriptions of events related to the search input, displayed along with still images taken from the events. The results may be in the form of a scrollable list. The results may include natural language sentences. The sentences may include location information and/or time information, such as, for example, geographical location, video image location, universal time, or temporal location within a video sequence.

Figure 10A:
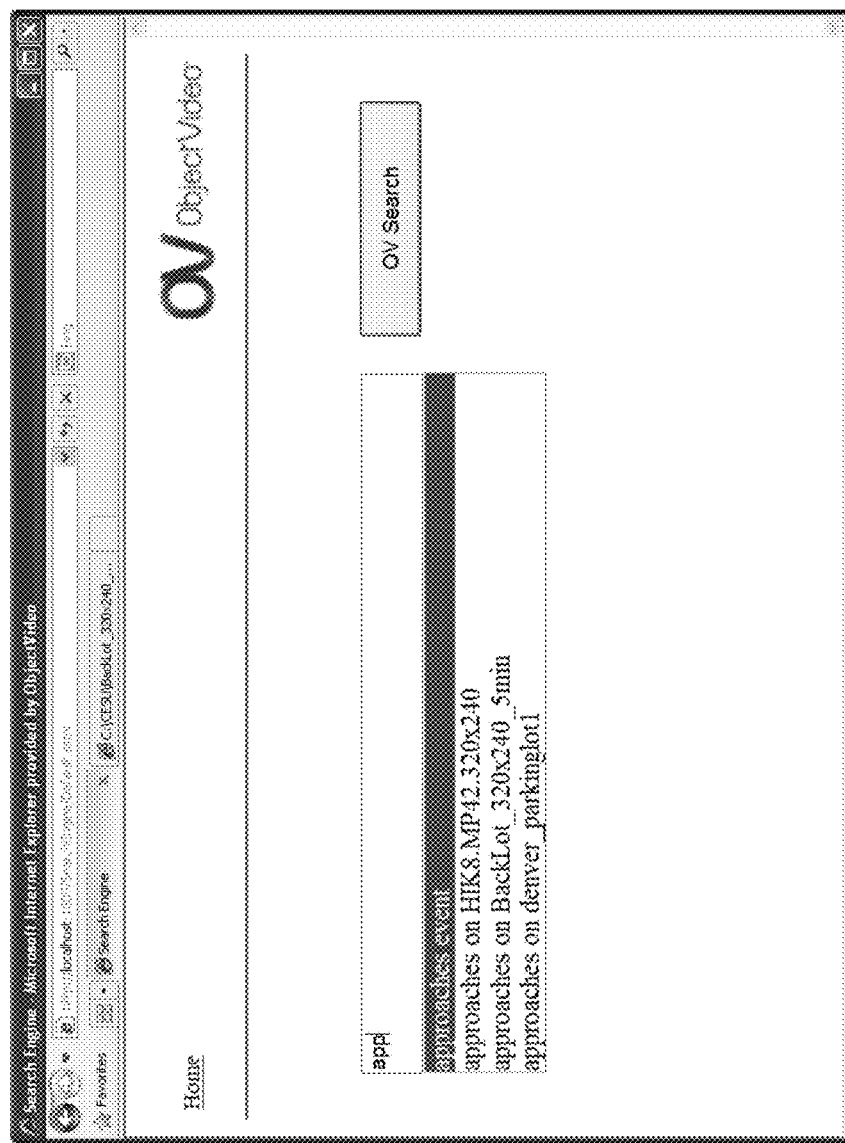
FIG. 10A is a depiction of an exemplary search entry interface, in accordance with certain exemplary embodiments.
Figure 10B:
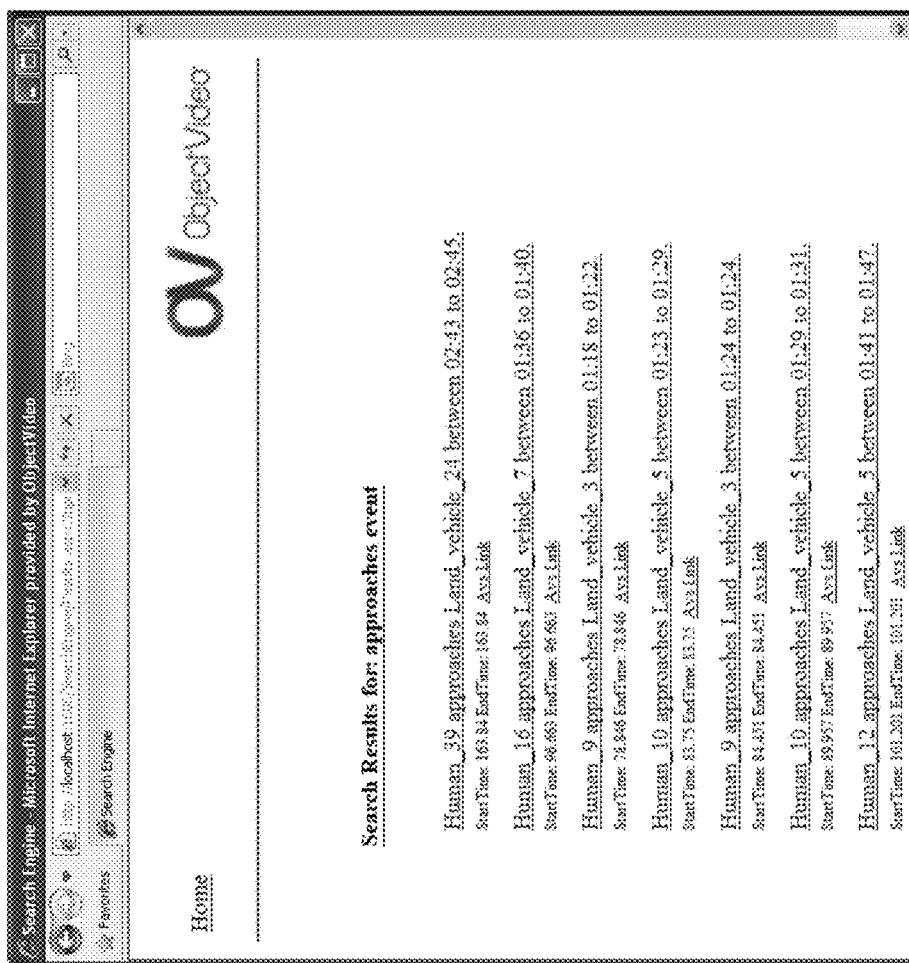
FIGS. 10B and 10C are depictions of exemplary search results interfaces, in accordance with certain exemplary embodiments.
Figure 10C:
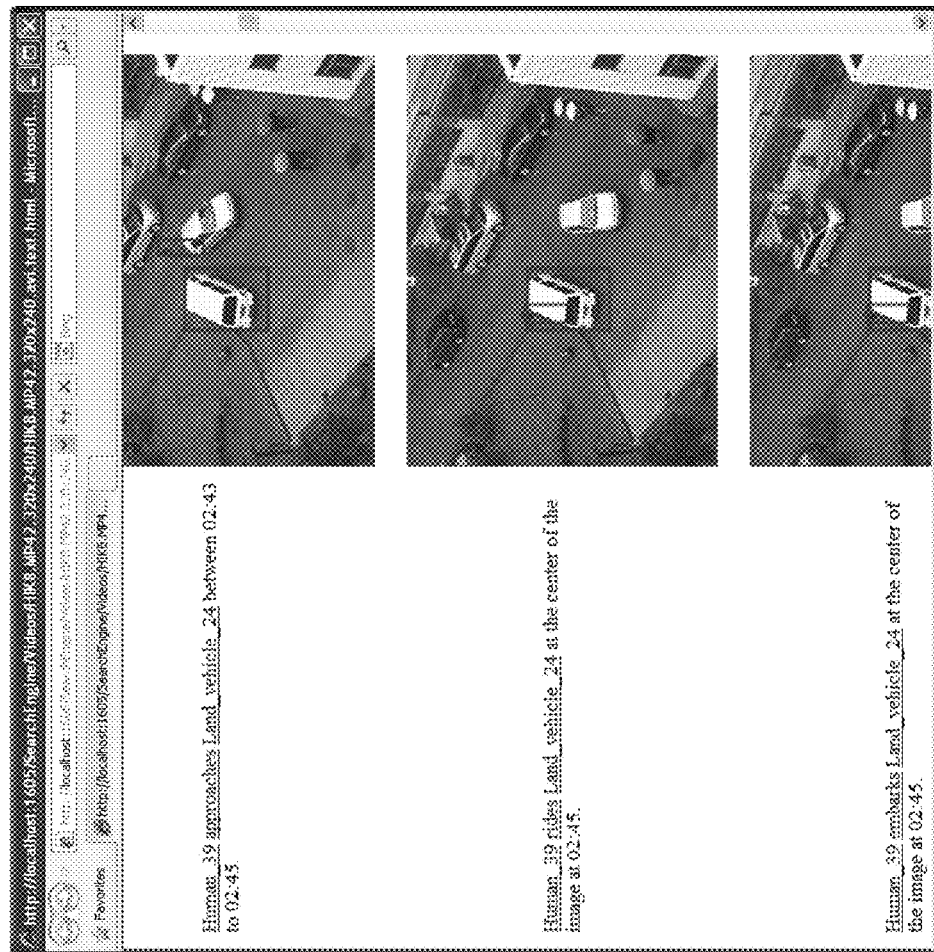

In another embodiment, as depicted in FIG. 10A-10C, searches may be performed in stages. For example, in one embodiment, in a first stage, only an input box is shown. The input box may include auto-fill features, dropdown capabilities, and/or other known features of text entry boxes. When a search is entered (e.g., via entering text in the text box and clicking on a search button), a list of results is displayed. In the example of FIG. 10B, the list of results includes a display of the search terms entered, and a list of natural language textual descriptions of events that match the search terms. The list may be a scrollable list. The natural language textual descriptions shown in FIG. 10B are clickable links, and the search results include, for each natural language textual description, an additional clickable link. In one embodiment, the first clickable links, when selected, cause the retrieval of a page such as shown in FIG. 10C, and the additional clickable links, when selected, cause the retrieval of the video clip that depicts the event. The retrieved video clip may be downloaded, or may be streamed. If streamed, it may be streamed alone, or as part of an entire video sequence. Furthermore, the embedded textual descriptions such as explained above in connection with FIGS. 5 and 6 may be included in the retrieved video clip.

FIG. 10C shows an example of what can be displayed when a link of the natural language textual description shown in FIG. 10B is selected. As a result of the selection, a set of events are displayed, including the selected event, and other events that precede and/or that follow the event at the same location or from the same video camera. In addition, a set of still images from among a plurality of continuous video images are displayed, each still image corresponding to the event next to which it is displayed. The images displayed may be, for example, thumbnail images. The search results may further display geographical information, and/or time information. The textual descriptions and/or images displayed in FIG. 10C can be clickable links as well, which when selected, in one embodiment link to a video clip of the event. Although a particular layout is shown in FIGS. 10A-10C, these layouts and interface designs are exemplary only. Other layouts or designs of the search input and results pages can be used.

Figure 10D:
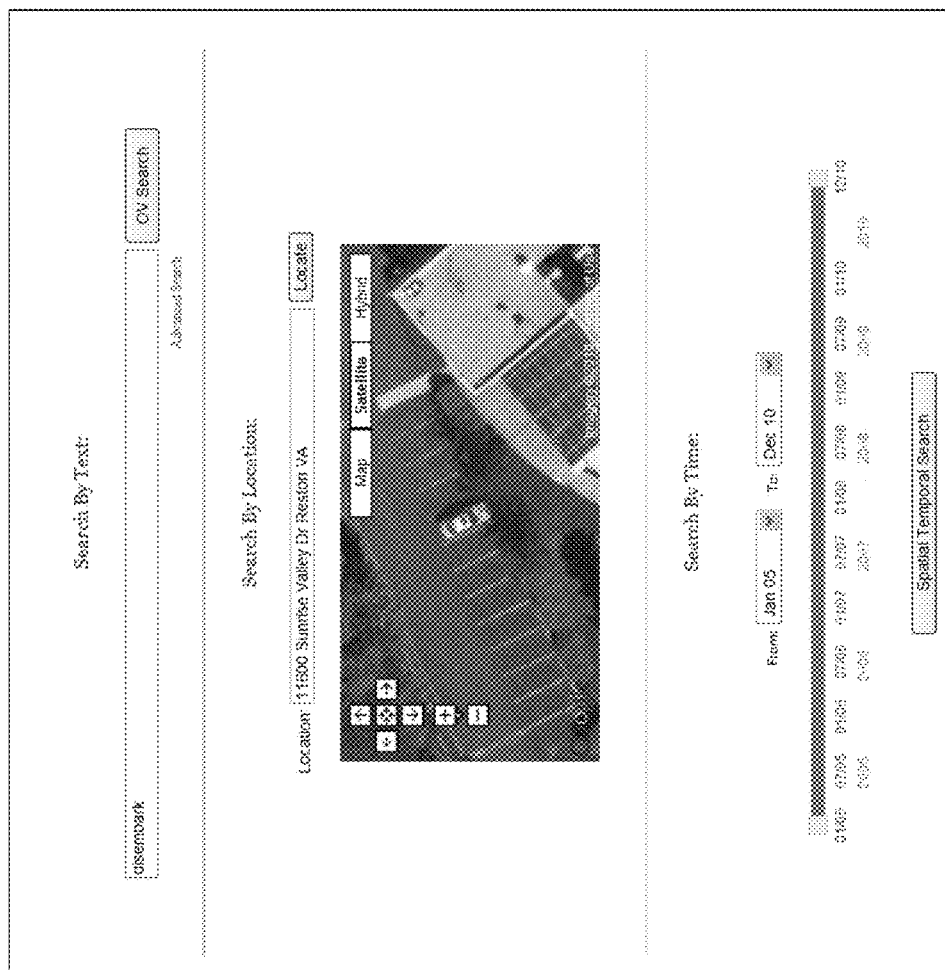
FIG. 10D is a depiction of another exemplary search entry interface, in accordance with certain exemplary embodiments.
Figure 10E:
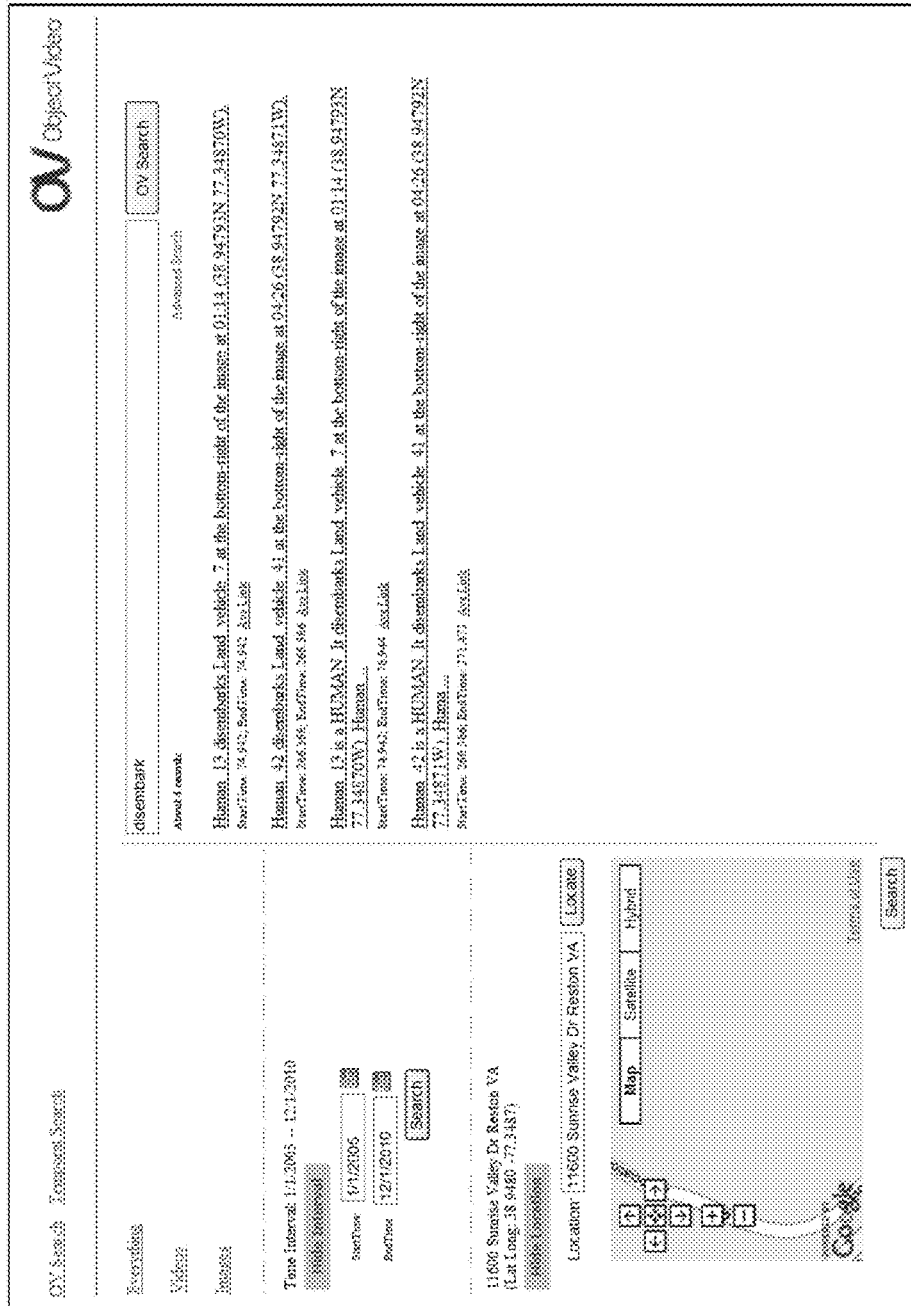
FIG. 10E is a depiction of another exemplary search results interface, in accordance with certain exemplary embodiments.

FIGS. 10D and 10E show additional examples of a search entry and retrieval interface. As shown in FIG. 10D, search requests can include, in addition to text inputs, time inputs, and/or location inputs. For example, a user can enter a keyword (e.g., "disembark,") to search for all events for that keyword, and the user can also enter a location, such as a geographical location (e.g., 11600 Sunrise Valley Dr. Reston, Va.) or GPS coordinates, and a time or time range, such as a date range (e.g., January, 2005 to December 2010). As a result, the surveillance system can return only events that match all of the search criteria. As shown for example in FIG. 10E, search results may include a list of links (e.g., similar to FIG. 10B), along with displays of the search terms input (keyword, dates, and map image). Though a specific example is shown in FIG. 10E, other variations may be used. For example, the search results list may further include still images for each event returned.

Figure 11A:
FIGS. 11A and 11B are depictions of exemplary video information being overlaid on a map and geographical image, in accordance with certain exemplary embodiments.
Figure 11B:
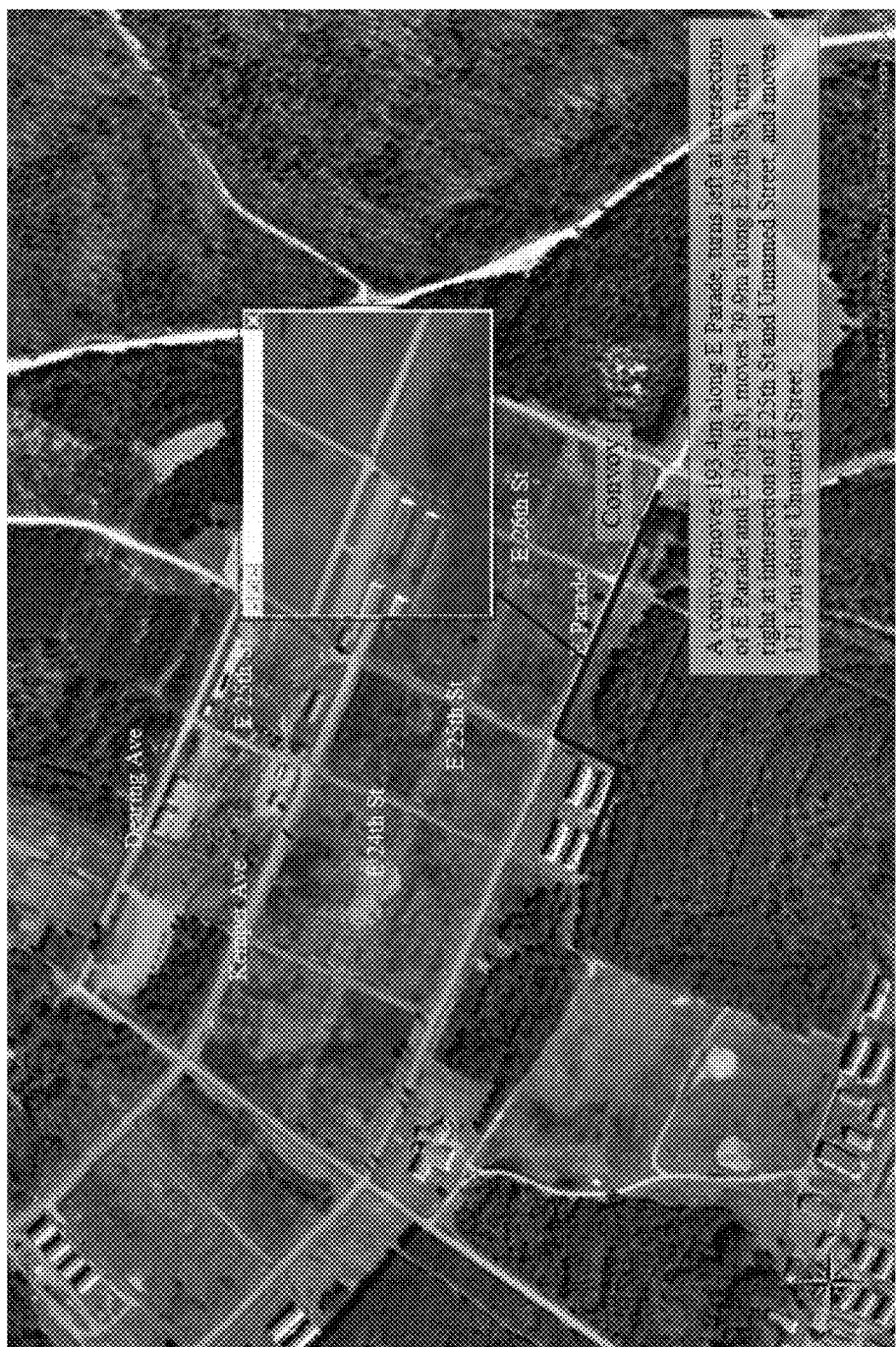

FIGS. 11A and 11B depict exemplary video information being overlaid on or displayed beside a map and geographical image, in accordance with certain exemplary embodiments.

In one embodiment, video images may be associated with geo-location information, either from manual or auto-calibration or from sensors such as GPS and navigation sensors. In certain embodiments, this information is used to provide browsing features that combine map and image data with event detection. For example, a large set of video corresponding to different events can be displayed on a map interface according to their geo-locations. Browsers such as the WorldWind application developed by NASA, or Google-Earth provide a GUI for placing and displaying geo-localized information on a map display. In one embodiment, as shown in FIG. 11A, a browser for displaying search results includes a plug-in to display thumbnails of a large set of video clips at their geo-locations in the browser interface.

They may include pointers to a precise location on the map. A user can click on the thumbnails to play the video files.

Scene content extraction can be greatly enhanced by integrating information from external knowledge databases, such as GIS data. GPS can be used as well. GPS sensors are increasingly being embedded in sensors providing geo-locations, and GIS data such as map-based Web services are becoming increasingly available.

A GIS database can be used to extract names and information about static scene features such as streets and buildings. With this information, it enhances the semantic annotation and text generation of the scene content that can be displayed to a user. For example, vehicle movement can be described in terms of street names: "a convoy crosses the intersection of E Parade and E 25th St in Nottoway, Va.," as shown in FIG. 11B. This facilitates communication and improves context awareness.

More generally, FIG. 11B shows a browser image that includes both a retrieved video clip as well as a textual description of the event overlaid on the map. The overlaid text and video may be based on video analyzed and text generated as a result of the systems and method described above in connection with FIGS. 1-6, and may also be retrieved as a result of a search such as described above in connection with FIGS. 7-10.

For example, video may be captured, and events automatically detected according to the previously described methods. Information including time of events and a geographical location may be stored along with a record of the events, as well as video clips and still images, in a database. Textual descriptions can be automatically generated. As a result of a search, or as a result of accessing enabled browser software, for at least a first event of the automatically detected events, a display system may display information based on the textual description and overlay the information on or display the information beside a map or image of a geographical area, such that the information is visually associated with a particular geographical location. The information for display may be created, for example, at a server computer, and transmitted to a client computer for display. For example, as shown in FIG. 11B, the display can include a map, including map information (e.g., street names, etc.), geographical image data (e.g., a satellite image of the area), or both. The display can additionally include generated text that explains an event. The text can be overlaid on the map, or displayed beside the map, and may point to or otherwise indicate the location of the event on the map. The generated text can be the automatically generated text generated based on event detection, and the text may be in the form of a natural language expression, such as a sentence. In addition, an image and/or video browser of the event may be displayed on the map at the location of the event, or pointing to the location of the event.

FIG. 12 shows an exemplary interface for search and retrieval of video information that can be used in a portable device, in accordance with certain disclosed embodiments. In one embodiment, the portable device is a smart phone or other hand-held device that can connect to a wireless network, for example to a cellular network or IEEE 802.11 network to access the Internet. The device may include one or more applications that allow for search input, map viewing, and video playback.

The portable device may be configured to perform event searches similar to those described above. An exemplary search interface is depicted in FIG. 12(A). In addition, the portable device may be configured to receive search results in the form of natural language textual descriptions. Although not shown, voice-based searches, using voice-to-text conversion applications, may be entered as well. An exemplary search retrieval interface is depicted in FIG. 12(B). The retrieval interface may additionally include a still image of the event retrieved, and/or may include an overlaid map feature, such as depicted in FIG. 11B. Furthermore, the portable device may be used to view video clips based on the search results (e.g., via a user selecting a video link). Also, the portable device may be configured to display results in the form of audio, such as using text-to-voice conversion. This may be used in a portable device, such as a smart phone, and also may be used for other types of devices.

In certain embodiments a user can perform a search for events that occur at a particular geographical location or in a particular geographical area without entering any geographical information. For example, in one embodiment, the user enters a keyword for an event search, and the portable device automatically sends its geographical location as part of the request. As a result, search results can be limited to a geographical location or area nearby the portable device. As such, the search for events using portable devices such as smart phones can be highly simplified and user-friendly.

The embodiments described above improve existing video surveillance systems by providing automated, intuitive methods for reviewing and searching for events captured in video. In particular, the automated event detection and text generation combined with the video insertion and/or geographical information and universal time aspects of the disclosed embodiments provides for high speed, pinpointed, and seamless search and retrieval for information such as video surveillance, which is elemental in providing safety for citizens in many different situations. The embodiments described above can be used for various fields. For example, in video surveillance, they can be used to detect potential criminal or terrorist activities, to monitor and improve traffic design, or for general investigation of events of interest. The embodiments can also be used in marketing and research fields, and in urban planning environments, for example, to monitor activity in different parts of a city, and plan for future projects.

Although a few exemplary embodiments have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A video surveillance system, comprising:
   a first video camera configured to capture at least a first video sequence including a plurality of video images;
   a processing system configured to automatically detect events;
   a storage system configured to receive and store records of the automatically detected events with respective geographical locations in association with the automatically detected events, the associated geographical location being at least in part based on map data; and
   a text generator configured to automatically generate textual descriptions of the automatically detected events, and
   wherein the automatically detected events are events that relate to the map data and are based on rules that relate to the map data, such that the text generator generates text that combines the map data with the automatically detected events into a report; and wherein a Geographical Information System (GIS) database is used to extract a name of a static scene feature in the video sequence and the name is included in the report.

2. The video surveillance system of claim 1, further comprising:
a file generator configured to generate a file including the first video sequence and including embedded text that reflects a first textual description associated with a first detected event that occurs at a first time of the first video sequence and is inserted in the first video sequence based on the first time, and a second textual description associated with a second detected event that occurs at a second time of the first video sequence and is inserted in the first video sequence based on the second time,
wherein the file is arranged so that when played back, the first textual description appears in the first video sequence at the first time and the second textual description appears in the first video sequence at the second time, such that the text displayed with the first video sequence changes,
wherein the file for the first video sequence includes a first set of video frames, each video frame of the first set corresponding to one of the video images and including for simultaneous display a video image and embedded text.

3. The video surveillance system of claim 2, further comprising:
a display system configured to play back the first video sequence and the embedded text, such that during the play back, individual video images of the first video sequence that are associated with an automatically detected event are displayed at the same time as embedded text describing the event.

4. The video surveillance system of claim 2, wherein the first time and second time include at least one of a temporal location within the video sequence and a universal time.

5. The video surveillance system of claim 1, wherein the processing system is further configured to automatically detect events that involve two or more agents in the video sequence.

6. The video surveillance system of claim 1, wherein the textual descriptions include a natural language sentence.

7. A video surveillance system comprising:
a first video camera configured to capture a first video sequence including a plurality of video images;
a processing system configured to automatically detect events in the video sequence;
a storage system configured to receive and store records of the automatically detected events and to associate each automatically detected event with a geographical location where the automatically detected event occurred, wherein the records of the automatically detected events are searchable using one or more dropdown lists;
a text generator configured to automatically generate a textual description of a first event of the automatically detected events, the textual description enhanced to include text that reflects the geographical location;
a file generator configured to generate a file including the first video sequence and including embedded text that reflects the textual description and that is inserted in the video sequence; and
a display system,
wherein for each automatically detected event, and based on the textual description for the event, the display system is configured to display information for the event, the information including the text that reflects the geographical location, and to overlay the information on a map of a geographical area that includes the geographical location, such that the information for the event including the text that reflects the geographical location is visually associated with a particular location on the map, and wherein a Geographical Information System (GIS) database is used to extract the text that reflects the geographical location.

8. The video surveillance system of claim 7, wherein the processing system is further configured to receive a search request including one or more natural language terms relating to the first event, and to return the information to be displayed and overlaid on the map of the geographical area, based on the search request.

9. The video surveillance system of claim 8, wherein the search request further includes at least one of: geographical information, or time information.

10. The video surveillance system of claim 8, wherein the display system includes a hand-held device configured to submit the search request and receive and display the information for the first event overlaid on the map of the geographical area.

11. The video surveillance system of claim 8, wherein the processing system is configured to determine search results based on the search request and based on a geographical location of a device that makes the request.

12. The video surveillance system of claim 11, wherein the device is a smart phone.

13. The video surveillance system of claim 11, wherein the file generator is further configured to generate clips of the first video sequence, each clip including a set of video images that comprises an event, and the processing system is further configured to associate data related to the event with the clip.

14. The video surveillance system of claim 13, wherein the processing system is further configured to receive a search request including one or more natural language terms relating to the first event, and return a clip of the first event based on the search request.

15. The video surveillance system of claim 7, further comprising:
for the first event, automatically displaying on the map, separately from the textual description for the first event, an indication of a route taken, the route corresponding to the first event.

16. A video surveillance method, comprising:
analyzing a first video sequence including a plurality of video images;
automatically detecting events in the first video sequence;
receiving and storing records of the automatically detected events and associating each of the automatically detected events with a geographical location at which the event occurs, wherein the records of the automatically detected events are searchable using one or more dropdown lists;
automatically generating a textual description of a first event of the automatically detected events, the textual description including text describing an actor, an action, and the geographical location; and
for the first event of the automatically detected events, causing a display system to display information based on the textual description and overlay the information on a map of a geographical area, such that the text describing the actor, the action, and the geographical location is visually associated with a particular geographical location depicted in the map, and wherein a Geographical Information System (GIS) database is used to extract the text describing the geographical location.

17. The video surveillance method of claim 16, further comprising receiving a search request including one or more natural language terms relating to the first event, and returning the information to be overlaid on the map of the geographical area, based on the search request.

18. The video surveillance method of claim 17, wherein the search request further includes at least one of: geographical information, or temporal information.

19. The video surveillance method of claim 17, further comprising, receiving the search request from a display device, and based on the search request, causing the display device to display the information for the first event overlaid on the map of the geographical area.

20. The video surveillance method of claim 17, further comprising determining search results based on the search request and based on a geographical location of a device that makes the request.

21. The video surveillance method of claim 20, wherein the device is a smart phone.

22. The video surveillance method of claim 16, further comprising generating a file including a video clip of the first video sequence and including embedded text that reflects the textual description and is inserted in the video clip based on a time associated with the first video sequence.

23. The video surveillance method of claim 22, further comprising:
   causing a display system to display the video clip and the embedded text, such that individual video images of the first video sequence that are associated with an automatically detected event are displayed at the same time as embedded text describing the event.

24. The video surveillance method of claim 16, wherein automatically detecting events includes automatically detecting events between two agents in the video sequence.

25. The video surveillance method of claim 16, further comprising:
   automatically displaying on the map, separately from the textual description, an indication of a route taken by the actor, the route corresponding to the first event.

26. A video searching method, comprising:
   capturing a plurality of video sequences from a plurality of respective video sources, each video sequence including a plurality of video images;
   for each video sequence, automatically detecting an event associated with a set of video images;
   for each detected event, storing a record of the event and associating with the record geographical information about the event;
   receiving a search request related to one or more events, the search request generated using at least one drop down menu, the search request including one or more natural language terms;
   searching from among the stored records for events that satisfy the search request;
   based on the results of the search, providing a natural language description for each automatically detected event, the natural language description for each automatically detected event including the geographical information about that event; and
   based on the results of the search, for each automatically detected event, causing a display device to display a map of a geographical area with the natural language description including the geographical information overlaid on the map and wherein a Geographical Information System (GIS) database is used to extract text that reflects the geographical information.

27. The video searching method of claim 26, further comprising:
   based on the results of the search, for each detected event, additionally transmitting a video clip described by the natural language description and associated with the geographical information, and/or with universal time information.

28. The video searching method of claim 27, further comprising:
   based on the results of the search, for each detected event, additionally providing, along with the natural language description and with the geographical information, universal time information, and/or a single image associated with the event.

29. The video searching method of claim 26, wherein part of the natural language description for an associated event comprises a link to a video clip for the associated event.

30. The video searching method of claim 29, wherein the video clip includes a series of video images of the associated event and an embedded natural language textual description of the event.

31. The video searching method of claim 26, wherein each video source is a video camera.

* * * * *